United States Patent
Allan et al.

(10) Patent No.: US 11,129,061 B1
(45) Date of Patent: Sep. 21, 2021

(54) LOCAL IDENTIFIER LOCATOR NETWORK PROTOCOL (ILNP) BREAKOUT

(71) Applicant: Telefonaktiebolaget LM Ericsson (publ), Stockholm (SE)

(72) Inventors: David Ian Allan, San Jose, CA (US); Joel Halpern, Leesburg, VA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/291,977

(22) PCT Filed: Nov. 7, 2018

(86) PCT No.: PCT/US2018/059694
§ 371 (c)(1),
(2) Date: May 6, 2021

(87) PCT Pub. No.: WO2020/096594
PCT Pub. Date: May 14, 2020

(51) Int. Cl.
*H04W 36/00* (2009.01)
*H04W 36/22* (2009.01)

(52) U.S. Cl.
CPC ... *H04W 36/0027* (2013.01); *H04W 36/0061* (2013.01); *H04W 36/00835* (2018.08); *H04W 36/22* (2013.01)

(58) Field of Classification Search
CPC ......... H04W 36/0027; H04W 36/0061; H04W 36/00835; H04W 36/22
See application file for complete search history.

(56) References Cited

U.S. PATENT DOCUMENTS

| 6,728,522 B1 | 4/2004 | Marrah et al. |
| 8,374,116 B2 | 2/2013 | Kitchin |

(Continued)

FOREIGN PATENT DOCUMENTS

| CN | 108513726 A | 9/2018 |
| CN | 108702723 A | 10/2018 |

(Continued)

OTHER PUBLICATIONS

3GPP, "3rd Generation Partnership Project; Technical Specification Group Radio Access Network; NR; NR and NG-RAN Overall Description; Stage 2, (Release 15)", Technical Specification, 3GPP TS 38.300 V15.3.1, Oct. 2018, 92 pages.

(Continued)

*Primary Examiner* — Khoa Huynh
(74) *Attorney, Agent, or Firm* — Nicholson, De Vos, Webster & Elliott, LLP

(57) ABSTRACT

A method implemented by a network device functioning as a source gNodeB in a cellular communication network to support incremental deployment of identifier locator network protocol (ILNP) breakout in the cellular communication network. The method includes sending a list of data network names (DNNs) advertised by an access and mobility management function (AMF) to a user equipment (UE), receiving from the UE a first request for a first session with an ILNP session and service continuity (SSC) mode, facilitating the UE establishing a first packet data network (PDN) session associated with a UE selected DNN, where the first PDN session requests the ILNP SSC mode, receiving from the UE a second request for a second session to the selected DNN using a non-ILNP SSC mode, and facilitating the UE establishing a second PDN session to the selected DNN using the non-ILNP SSC mode.

20 Claims, 13 Drawing Sheets

(56) References Cited

U.S. PATENT DOCUMENTS

| | | |
|---|---|---|
| 8,503,416 B2 | 8/2013 | Haddad et al. |
| 8,510,551 B1 | 8/2013 | Desai et al. |
| 8,537,816 B2 | 9/2013 | Anumala et al. |
| 8,625,465 B1 | 1/2014 | Aggarwal et al. |
| 8,867,355 B2 | 10/2014 | Klein et al. |
| 8,879,394 B2 | 11/2014 | Allan et al. |
| 8,892,725 B2 | 11/2014 | Wang et al. |
| 9,894,554 B2 | 2/2018 | Luo |
| 10,015,132 B1 | 7/2018 | Qin et al. |
| 10,098,042 B2 | 10/2018 | Lee et al. |
| 10,582,428 B2 | 3/2020 | Xu et al. |
| 10,716,045 B2 | 7/2020 | Allan et al. |
| 10,772,013 B2 | 9/2020 | Fujishiro et al. |
| 2001/0021175 A1 | 9/2001 | Haverinen |
| 2004/0066745 A1 | 4/2004 | Joe |
| 2004/0206408 A1 | 10/2004 | Peters et al. |
| 2004/0264374 A1 | 12/2004 | Yu et al. |
| 2005/0007954 A1 | 1/2005 | Sreemanthula et al. |
| 2005/0063307 A1 | 3/2005 | Samuels et al. |
| 2005/0141545 A1 | 6/2005 | Fein et al. |
| 2006/0114903 A1 | 6/2006 | Duffy et al. |
| 2006/0120288 A1 | 6/2006 | Vasseur et al. |
| 2006/0155801 A1 | 7/2006 | Brabson |
| 2007/0211735 A1 | 9/2007 | Williamson |
| 2008/0175240 A1 | 7/2008 | Suzuki |
| 2009/0003214 A1 | 1/2009 | Vaswani et al. |
| 2009/0103468 A1 | 4/2009 | Kasapidis |
| 2010/0054245 A1 | 3/2010 | Asati et al. |
| 2010/0103856 A1 | 4/2010 | Kim et al. |
| 2010/0118781 A1 | 5/2010 | Petrovic et al. |
| 2010/0208742 A1 | 8/2010 | Kafle et al. |
| 2010/0303072 A1 | 12/2010 | Jokela et al. |
| 2011/0002301 A1 | 1/2011 | Chan et al. |
| 2011/0013557 A1 | 1/2011 | Westberg et al. |
| 2011/0228770 A1 | 9/2011 | Dholakia et al. |
| 2011/0286450 A1 | 11/2011 | Wijnands |
| 2012/0173694 A1 | 7/2012 | Yan et al. |
| 2012/0180122 A1 | 7/2012 | Yan et al. |
| 2012/0202502 A1 | 8/2012 | Wu |
| 2012/0257598 A1 | 10/2012 | Karampatsis et al. |
| 2012/0314714 A1 | 12/2012 | Hu et al. |
| 2012/0320876 A1 | 12/2012 | Zhou et al. |
| 2013/0188638 A1 | 7/2013 | Venaas et al. |
| 2013/0215772 A1 | 8/2013 | Kaur et al. |
| 2013/0294396 A1 | 11/2013 | Iwamura et al. |
| 2014/0112139 A1 | 4/2014 | Allan et al. |
| 2014/0115135 A1 | 4/2014 | Allan et al. |
| 2014/0189160 A1 | 7/2014 | Haddad et al. |
| 2014/0198706 A1 | 7/2014 | Jung et al. |
| 2014/0226642 A1 | 8/2014 | Haddad et al. |
| 2014/0254591 A1 | 9/2014 | Mahadevan et al. |
| 2014/0269412 A1 | 9/2014 | Venaas et al. |
| 2014/0297875 A1 | 10/2014 | Cheng et al. |
| 2014/0317249 A1 | 10/2014 | Janakiraman et al. |
| 2014/0362854 A1 | 12/2014 | Addanki et al. |
| 2015/0074741 A1 | 3/2015 | Janakiraman et al. |
| 2015/0085640 A1 | 3/2015 | Song |
| 2015/0138961 A1 | 5/2015 | Wijnands et al. |
| 2015/0156660 A1 | 6/2015 | Luo |
| 2015/0181473 A1 | 6/2015 | Horn et al. |
| 2015/0236954 A1 | 8/2015 | Cheng et al. |
| 2015/0365885 A1 | 12/2015 | Yang et al. |
| 2016/0065531 A1 | 3/2016 | Xiaopu et al. |
| 2016/0072825 A1 | 3/2016 | Faccin et al. |
| 2016/0095019 A1 | 3/2016 | Cui et al. |
| 2016/0119159 A1 | 4/2016 | Zhao et al. |
| 2016/0127459 A1 | 5/2016 | Qi |
| 2016/0127889 A1 | 5/2016 | Cui et al. |
| 2016/0134526 A1 | 5/2016 | Maino et al. |
| 2016/0173356 A1 | 6/2016 | Jiang et al. |
| 2016/0183127 A1 | 6/2016 | Xu et al. |
| 2016/0212778 A1 | 7/2016 | Grootwassink et al. |
| 2016/0227439 A1 | 8/2016 | Wang et al. |
| 2016/0277463 A1 | 9/2016 | Nagarajan et al. |
| 2016/0286441 A1 | 9/2016 | Kweon et al. |
| 2017/0026417 A1 | 1/2017 | Ermagan et al. |
| 2017/0068453 A1 | 3/2017 | Wijnands et al. |
| 2017/0093689 A1 | 3/2017 | Manur et al. |
| 2017/0118787 A1 | 4/2017 | Kekki et al. |
| 2017/0222920 A1 | 8/2017 | Thubert et al. |
| 2017/0289855 A1 | 10/2017 | Xu et al. |
| 2017/0317841 A1 | 11/2017 | Xu |
| 2017/0325055 A1 | 11/2017 | Enomoto et al. |
| 2017/0332420 A1 | 11/2017 | Cui et al. |
| 2017/0339623 A1 | 11/2017 | Pillay-Esnault |
| 2017/0373962 A1 | 12/2017 | Keeley et al. |
| 2018/0007604 A1 | 1/2018 | Pillay-Esnault |
| 2018/0167311 A1 | 6/2018 | Hasani et al. |
| 2018/0241671 A1 | 8/2018 | Bosch et al. |
| 2018/0242395 A1 | 8/2018 | Selvaganapathy et al. |
| 2018/0278521 A1 | 9/2018 | Pfister et al. |
| 2018/0278522 A1 | 9/2018 | Asati et al. |
| 2018/0279397 A1 | 9/2018 | Faccin et al. |
| 2019/0028933 A1 | 1/2019 | Kawasaki et al. |
| 2019/0075497 A1 | 3/2019 | Zhu et al. |
| 2019/0150219 A1* | 5/2019 | Wang ............... H04W 76/30 370/329 |
| 2019/0150225 A1 | 5/2019 | Mohamed et al. |
| 2019/0274076 A1 | 9/2019 | Kim et al. |
| 2019/0289506 A1* | 9/2019 | Park ............... H04W 76/27 |
| 2019/0306758 A1 | 10/2019 | Ma et al. |
| 2020/0053803 A1* | 2/2020 | Youn ............... H04W 76/10 |
| 2020/0245206 A1 | 7/2020 | Allan |

FOREIGN PATENT DOCUMENTS

| | | |
|---|---|---|
| EP | 2723026 A1 | 4/2014 |
| EP | 2782372 A1 | 9/2014 |
| EP | 2858315 A1 | 4/2015 |
| WO | 2015/120902 A1 | 8/2015 |
| WO | 2017/180335 A1 | 10/2017 |
| WO | 2018/006017 A1 | 1/2018 |
| WO | 2018/138544 A1 | 8/2018 |
| WO | 2018/138545 A1 | 8/2018 |
| WO | 2018/162947 A1 | 9/2018 |
| WO | 2018/183740 A1 | 10/2018 |
| WO | 2018/207006 A1 | 11/2018 |
| WO | 2020/084335 A1 | 4/2020 |
| WO | 2020/096594 A1 | 5/2020 |

OTHER PUBLICATIONS

3GPP, "3rd Generation Partnership Project; Technical Specification Group Services and System Aspects; Procedures for the 5G System; Stage 2, (Release 15)", Technical Specification, 3GPP TS 23.502 V15.3.0, Sep. 2018, 330 pages.

3GPP, "3rd Generation Partnership Project; Technical Specification Group Services and System Aspects; System Architecture for the 5G System; Stage 2, (Release 15)", Technical Specification, 3GPP TS 23.501 V15.3.0, Sep. 2018, 226 pages.

Atkinson, et al., "ICMP Locator Update message for ILNPv6; draft-irtf-rrg-ilnp-icmpv6-06," Internet Draft, IETF Trust, Jul. 10, 2012, pp. 1-12.

Atkinson, et al., "ILNP Architectural Description; draft-irtf-rrg-ilnp-arch-06 txt," IETF Trust, Internet Draft, Jul. 10, 2012, pp. 1-53.

Atkinson, et al., "IPv6 Nonce Destination Option for ILNPv6; draft-irtf-rrg-ilnp-noncev6-06.txt," IETF Trust, Internet Draft, Jul. 10, 2012, pp. 1-14.

Atkinson, et al., "Optional Advanced Deployment Scenarios for ILNP; draft-irtf-rrg-ilnp-adv-00.txt," Internet Draft, IETF Trust, Jan. 12, 2012, pp. 1-25.

Bogineni, et al., "Optimized Mobile User Plane Solutions for 5G; draft-bogineni-dmm-optimized-mobile-user-plane-00.txt," Internet-Draft, IETF Trust, Mar. 5, 2018, pp. 1-39.

Cabellos, et al., "An Architectural Introduction to the Locator/ID Separation Protocol (LISP); draft-ietf-lisp-introduction-13.txt," Internet Engineering Task Force, IETF Trust, Network Working Group, Internet-Draft, Apr. 2, 2015, pp. 1-27.

Cabellos, et al., "LISPmob: Mobile Networking through LISP," Dec. 14, 2011, retrieved from http://www.openoverlayrouter.org/lispmob/sites/default/files/users/user1/documents/LISPmob_Whitepaper.pdf on May 9, 2017, pp. 1-8.

(56) References Cited

OTHER PUBLICATIONS

Farinacci, et al., "LISP for the Mobile Network; draft-farinacci-lisp-mobile-network-04.txt," Internet Engineering Task Force, IETF Trust, Network Working Group, Internet-Draft, Sep. 11, 2018, pp. 1-24.
Fuller, et al., "LISP Delegated Database Tree, draft-ietf-lisp-ddt-08," IETF Trust, Network Working Group, Internet-Draft, Sep. 8, 2016, pp. 1-37.
Gohar, et al., "A Seamless Handover Scheme in LISP Networks," 2013 International Conference on ICT Convergence (ICTC), IEEE, Oct. 14, 2013, pp. 1-4.
Hu, et al., "ID/Locator Distributed Mapping Server; draft-hu-lisp-dht-00.txt," Internet Engineering Task Force, Internet-Draft, Oct. 18, 2009, pp. 1-11.
Kurebayashi, et al., "Evolving 5G Routing," XP055539760, IETF Mail Archive, Sep. 21, 2017, pp. 1-17.
Moreno, et al., "Signal-Free LISP Multicast; draft-ietf-lisp-signal-free-multicast-01," Internet Engineering Task Force, IETF Trust, Network Working Group, Internet-Draft, Apr. 21, 2016, pp. 1-19.
Mueller, et al., "Mobility Management for 5G Network Architectures using Identifier-Locator Addressing; draft-mueller-ila-mobility-01.txt," Internet Engineering Task Force, IETF, Oct. 3, 2016, pp. 1-21.
RFC 6329: Fedyk, et al., "IS-IS Extensions Supporting IEEE 802.1aq Shortest Path Bridging," Internet Engineering Task Force (IETF), Request for Comments: 6329, Apr. 2012, pp. 1-38.
RFC 6740: Atkinson, et al., "Identifier-Locator Network Protocol (ILNP) Architectural Description," IETF Trust, Internet Research Task Force, Request for Comments: 6740, Nov. 10, 2012, pp. 1-53.
RFC 6741: Atkinson, et al., "Identifier-Locator Network Protocol (ILNP) Engineering Considerations," Internet Engineering Task Force, IETF Trust, Internet Research Task Force (IRTF), Request for Comments: 6741, Nov. 2012, pp. 1-38.
RFC 6742: Atkinson, et al., "DNS Resource Records for the Identifier-Locator Network Protocol (ILNP)," Internet Engineering Task Force, IETF Trust, Internet Research Task Force (IRTF), Request for Comments: 6742, Nov. 2012, pp. 1-20.
RFC 6743: Atkinson, et al., "ICMP Locator Update Message for the Identifier-Locator Network Protocol for IPv6 ILNPv6)," Internet Engineering Task Force, IETF Trust, Internet Research Task Force (IRTF), Request for Comments: 6743, Nov. 2012, pp. 1-12.
RFC 6744: Atkinson, et al., "IPv6 Nonce Destination Option for the Identifier-Locator Network Protocol for IPv6 ILNPv6)," Internet Engineering Task Force, IETF Trust, Internet Research Task Force (IRTF), Request for Comments: 6744, Nov. 2012, pp. 1-14.
RFC 6748: Atkinson, et al., "Optional Advanced Deployment Scenarios for the Identifier-Locator Network Protocol ILNP)," Internet Engineering Task Force, IETF Trust, Internet Research Task Force (IRTF), Request for Comments: 6748, Nov. 2012, pp. 1-37.
RFC 6831: Farinacci, et al., "The Locator/ID Separation Protocol (LISP) for Multicast Environments," Internet Engineering Task Force (IETF), Request for Comments: 6831, Jan. 2013, pp. 1-28.
Rui, T., "Network Access Control Mechanism Based on Locator/Identifier Split," International Conference on Networking, Architecture, and Storage (NAS 2009), IEEE, Jul. 9, 2009, pp. 171-174.
Wijnands, et al., "Multicast using Bit Index Explicit Replication; draft-ietf-bier-architecture-04," Internet Engineering Task Force (IETF), Internet-Draft, Jul. 18, 2016, pp. 1-36.
Wijnands, et al., "Multicast using Bit Index Explicit Replication; draft-wijnands-bier-architecture-05," Internet Engineering Task Force, Internet-Draft, Mar. 6, 2015, pp. 1-30.

* cited by examiner

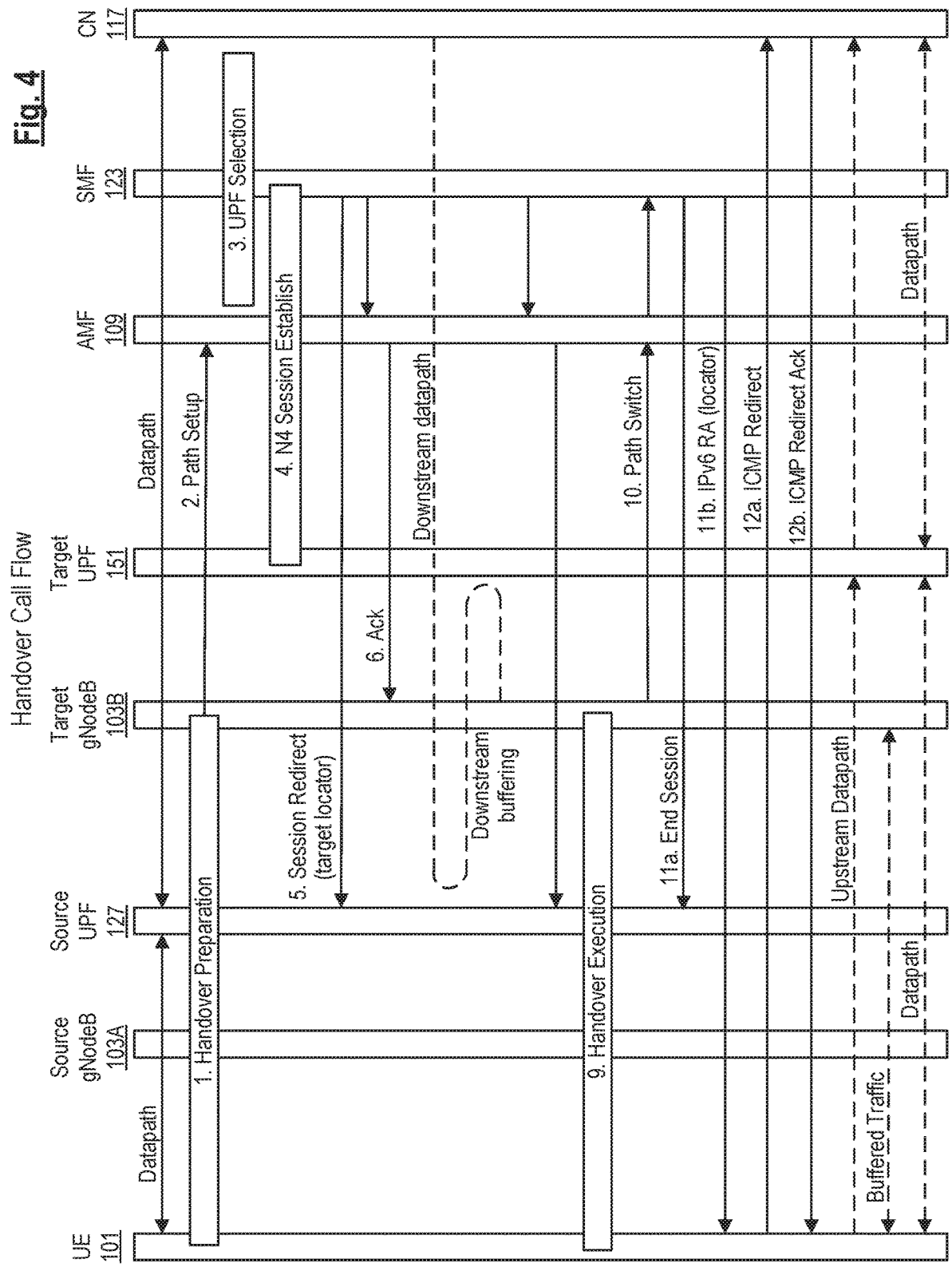

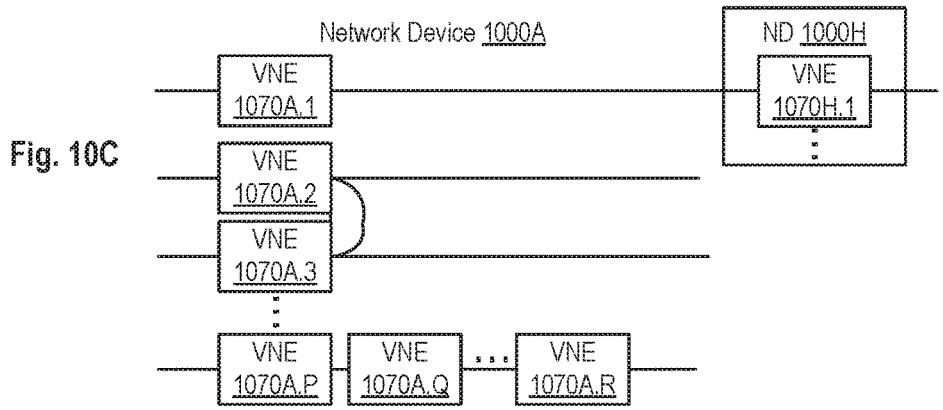
Fig. 10C
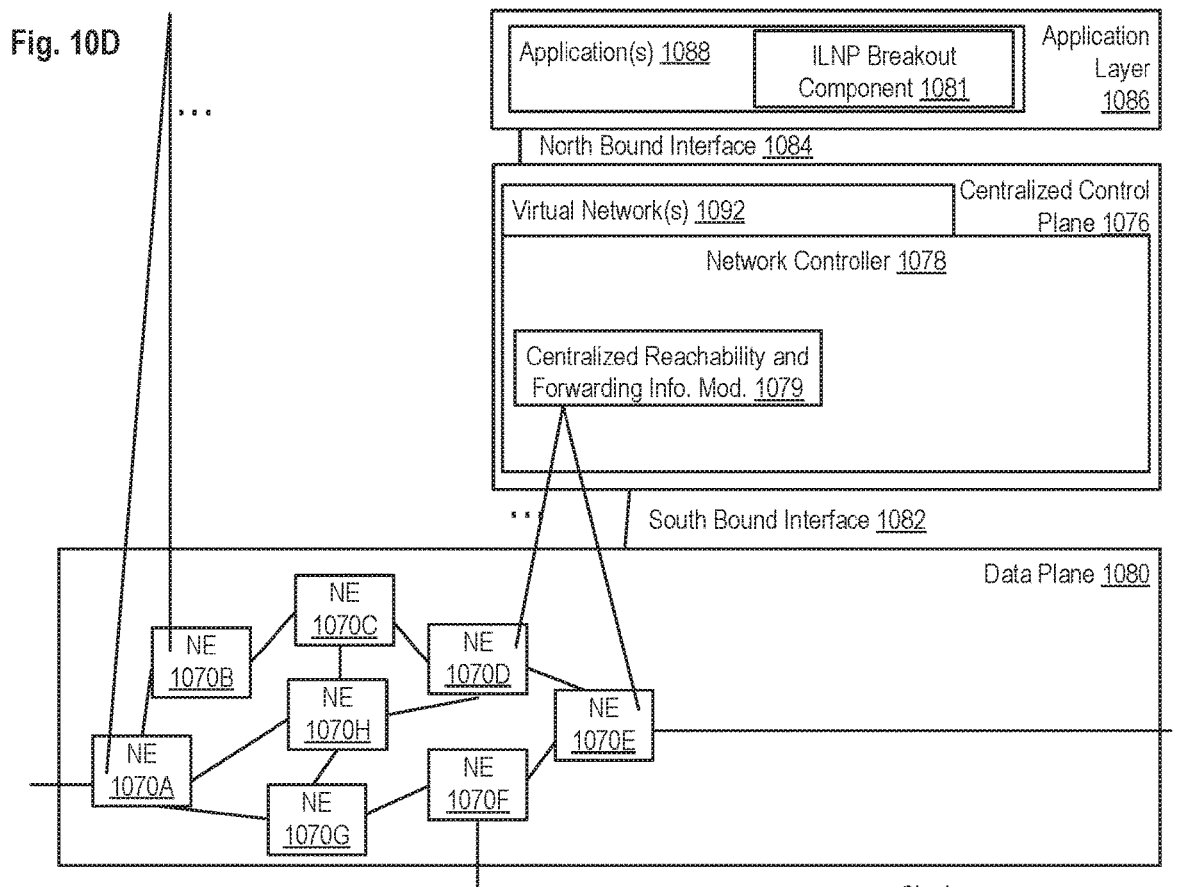
Fig. 10D
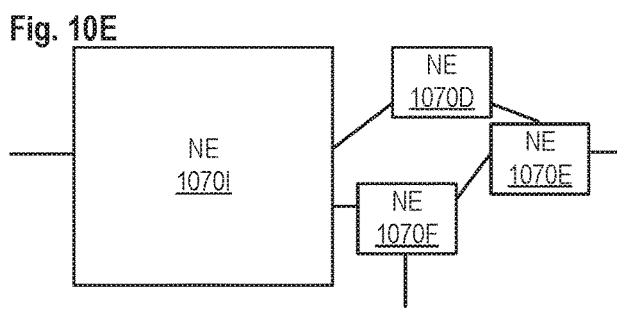
Fig. 10E
Fig. 10F

— LOCAL IDENTIFIER LOCATOR NETWORK PROTOCOL (ILNP) BREAKOUT

CROSS-REFERENCE TO RELATED APPLICATIONS

This application is a national stage of International Application No. PCT/US2018/059694 filed Nov. 7, 2018, which is hereby incorporated by reference.

TECHNICAL FIELD

Embodiments of the invention relate to the field of 5th Generation (5G) mobile communication technology and more specifically, to a method and system for using identifier locator network protocol (ILNP) to enable a distributed gateway architecture to improve efficiency in a 5G network by eliminating inefficiency related to the use of anchor points and further methods for efficiently managing handover of user equipment between attachment points.

BACKGROUND

Referring to FIG. 1, cellular communication networks enable user equipment (UE) 101, such as cellular phones and similar computing devices, to communicate using spread spectrum radio frequency communication. The UE 101 communicates directly with a radio access network (RAN). The RAN includes a set of base stations such as 5G new radio (NR) base stations, referred to as gNodeB 103. FIG. 1 is a diagram of an example architecture for a cellular communication system consistent with 5G cellular communication architecture including an example UE 101 communicating with a gNodeB 103 of the network. The gNodeB 103 interfaces with a packet core network or 5G network core (5GC) 115 that connects the UE to other devices in the cellular communication network and with devices external to the cellular communication network.

The 5GC 115 and its components are responsible for enabling communication between the UE 101 and other devices both internal and external to the cellular communication system. The 5GC 115 includes a user plane function (UPF) 105, a session management function (SMF) 123, an access and mobility management function (AMF) 109 and similar components. Additional components are part of the 5GC 115, but the components with less relevance to the handling of the UE 101 and its mobility have been excluded for clarity and to simplify the representation. The UE 101 may change the gNodeB 103 through which it communicates with the network as it moves about geographically. The AMF 109, UPF 105 and SMF 123 coordinate to facilitate this mobility of the UE 101 without interruption to any ongoing telecommunication session of the UE 101.

The AMF 109 is a control node that, among other duties, is responsible for connection and mobility management tasks. The UE 101 sends connection, mobility, and session information to the AMF 109, which manages the connection and mobility related tasks. The SMF handles session management for the UE 101.

The UPF 105 provides anchor points for a UE 101 enabling various types of transitions that facilitate the mobility of the UE 101 without the UE losing connections with other devices. The UPF 105 routes and forwards data to and from the UE 101 while functioning as a mobility anchor point for the UE 101 handovers between gNodeBs 103 and between 5G, long term evolution (LTE) and other 3GPP technologies. The UPF 105 also provides connectivity between the UE 101 and external data packet networks by being a fixed anchor point that offers the UE's Internet Protocol (IP) address into a routable packet network.

As shown in the example simplified network of FIG. 1, a UE 101 communicates with the 5GC 115 via the gNodeB 103 and reaches a correspondent 113, or 121 via a UPF 105. In this example, the traffic from the UE 101 would traverse the connected gNodeB 103, and the UPF 105, to reach a correspondent 113. The correspondents 113, 121 can be any device capable of receiving the traffic from the UE 101 and sending traffic to the UE 101 including cellular phones, computing devices and similar devices that may be connected through any number of intermediate networking or computing devices.

SUMMARY

In one embodiment, a method is implemented by a network device functioning as a source gNodeB in a cellular communication network to support incremental deployment of identifier locator network protocol (ILNP) breakout in the cellular communication network. The method includes sending a list of data network names (DNNs) advertised by an access and mobility management function (AMF) to a user equipment (UE), receiving from the UE a first request for a first session with an ILNP session and service continuity (SSC) mode, facilitating the UE establishing a first packet data network (PDN) session associated with a UE selected DNN, where the first PDN session requests the ILNP SSC mode, receiving from the UE a second request for a second session to the selected DNN using a non-ILNP SSC mode, and facilitating the UE establishing a second PDN session to the selected DNN using the non-ILNP SSC mode.

In another embodiment, a method is implemented by the UE in a cellular communication network to support incremental deployment of ILNP breakout in the cellular communication network. The method of the UE includes receiving an advertisement for a list of DNNs from a source gNodeB, establishing a first PDN session associated with a DNN selected from the list using an ILNP SSC mode, establishing a second PDN session associated with the selected DNN using a non-ILNP SSC mode, sending traffic destined for a first correspondent node (CN) that is ILNP capable via the first PDN session, and sending traffic destined for a second CN that is not ILNP capable via the second PDN session.

In another embodiment, a network device to function as a source gNodeB in a cellular communication network implements a method to support incremental deployment of ILNP breakout in the cellular communication network. The network device includes a non-transitory computer-readable medium having stored therein an ILNP breakout component, and a set of one or more processors coupled to the non-transitory computer-readable medium. The set of one or more processors execute the ILNP breakout component. The ILNP breakout component sends a list of DNNs advertised by an AMF to the UE, receives from the UE a first request for a first session with an ILNP SSC mode, facilitates the UE establishing a first PDN session associated with a UE selected DNN, where the first PDN session requests the ILNP SSC mode, receives from the UE a second request for a second session to the selected DNN using a non-ILNP SSC mode, and facilitates the UE establishing a second PDN session to the selected DNN using the non-ILNP SSC mode.

In a further embodiment, the UE to operate in a cellular communication network implements a method that supports incremental deployment of ILNP breakout in the cellular communication network. The UE including a non-transitory computer-readable medium having stored therein an ILNP breakout component, and a set of one or more processors coupled to the non-transitory computer-readable medium. The set of one or more processors to execute the ILNP breakout component, which causes the UE to receive an advertisement for a list of DNNs from a source gNodeB, to establish a first PDN session associated with a DNN selected from the list using an ILNP SSC mode, to establish a second PDN session associated with the selected DNN using a non-ILNP SSC mode, to send traffic destined for a first CN that is ILNP capable via the first PDN session, and to send traffic destined for a second CN that is not ILNP capable via the second PDN session.

BRIEF DESCRIPTION OF THE DRAWINGS

The invention may best be understood by referring to the following description and accompanying drawings that are used to illustrate embodiments of the invention. In the drawings:

FIG. 4 is a diagram of one embodiment of a handover call flow, according to some embodiments.

FIG. 10C illustrates various exemplary ways in which virtual network elements (VNEs) may be coupled according to some embodiments.

FIG. 10D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 10E illustrates the simple case of where each of the NDs implements a single NE, but a centralized control plane has abstracted multiple of the NEs in different NDs into (to represent) a single NE in one of the virtual network(s), according to some embodiments.

FIG. 10F illustrates a case where multiple VNEs are implemented on different NDs and are coupled to each other, and where a centralized control plane has abstracted these multiple VNEs such that they appear as a single VNE within one of the virtual networks, according to some embodiments.

DETAILED DESCRIPTION

Figure 1:
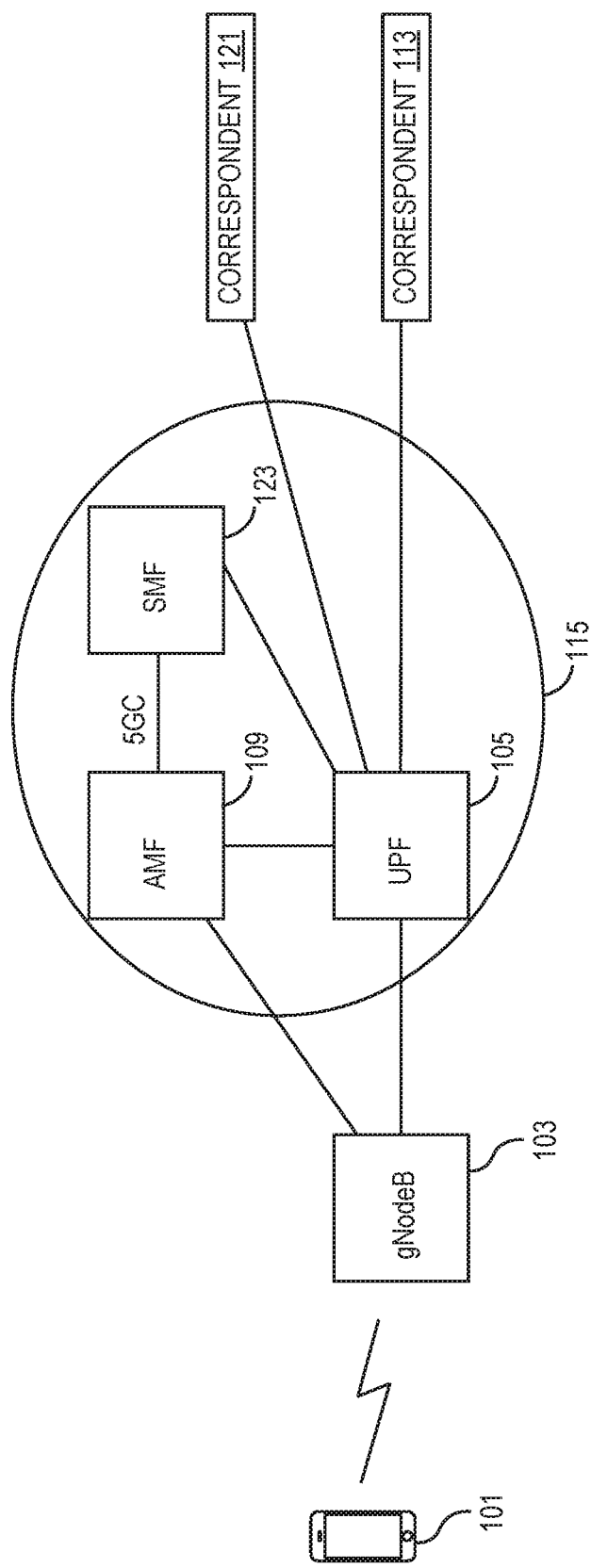
FIG. 1 is a diagram of one embodiment of a 5G network architecture.

The following description sets forth methods and system for incrementally deploying identifier locator network protocol (ILNP) breakout in a cellular communication network such as a $5^{th}$ generation (5G) mobile architecture network. ILNP breakout uses ILNP to enable a distributed gateway architecture to improve efficiency in a 5G network by eliminating inefficiency related to the use of anchor points and distributing gateway functionality closer to the edge of the network. ILNP is an enabler of this as it addresses seamless session mobility without the use of anchor points. The 5G architecture and the geographic placement of its components is driven by both technical and business considerations and requires specific functionalities and functional distributions to be carried forward in any update to the architecture. Embodiments provide improved efficiency while preserving the key functionalities of the 5G architecture.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The 5G architecture enables user equipment (UE) mobility by hiding the true location of a UE from a correspondent node (CN) by tunneling traffic to the UE via fixed anchor points (e.g., a user plane function (UPF)) in the cellular communication network. This allows the UE to change location without needing to change its address (which as a consequence of the use of an anchor point and tunnels appears as a geographically fixed location to correspondents). However, the use of fixed anchor points may introduce inefficiencies in the cellular communication network. Traffic from a UE must be tunneled to the UPF before reaching a correspondent node (CN), even if the CN is located in the same network as the UE (e.g., a home network scenario), which can introduce bandwidth and latency inefficiencies in the cellular communication network. This can be further exacerbated if the correspondent is also a UE anchored on a different UPF.

The UPF in the 5G network architecture implements specific functionalities not easily dispensed with as they address business and regulatory requirements. Embodiments avoid some of the inefficiencies introduced by the use of fixed anchor points in the 5G network architecture by splitting the user plane functions of each gateway from the control plane functions and distributing the user plane functions to the gNodeBs. This can be done without changing key aspects of the 5G network architecture if the control plane functions remain in the centralized or invariant location. Distributing the user plane functions near or to the gNodeBs enables much of the traffic to avoid being tunneled to the potentially distant components of the 5G network. The 5G network architecture has split the anchor point into UPF and SMF, which facilitates a distributed implementation by pinning the control component.

Embodiments disclosed herein use ILNP to enable the distribution of the user plane functions that allows traffic to be broken out locally without having to go through potentially distant anchor points (this ability to break out traffic locally using ILNP may generally be referred to herein as "ILNP breakout").

ILNP is a network protocol that changes the semantics of an Internet Protocol (IP) address to have two distinct namespaces. The first namespace is referred to as an identifier and the second namespace is referred to as a locator. The identifier is a non-topological name for uniquely identifying a node. The locator is a topologically bound name for an Internet Protocol (IP) subnetwork and is hierarchically structured as per the IPv6 addressing plan. By separating identifier and locator, a device can change locations within a network without the identity of the device changing and therefore associated session state (e.g. transmission control protocol (TCP) or IP security (IPSEC)) remains valid independent of the device's point of attachment to the network. The change in semantics of the IP address is transparent to the network layer so routers in the network would forward IP packets and ILNP packets in the same manner.

For a UE and a CN to communicate using ILNP, both the UE and the CN need to implement ILNP. An entity (e.g., UE or CN) that implements ILNP may be referred to herein as being ILNP capable. An entity that does not implement ILNP may be referred to herein as being non-ILNP capable. A UE cannot use ILNP for mobility if the CN is not ILNP capable. Also, gNodeBs need to support procedures that permit ILNP to operate as well as optionally have a co-located UPF to enable seamless handover. However, it is foreseen that at least initially, not all UEs and CNs will be ILNP capable and not all gNodeBs will support procedures to enable ILNP operation. Thus, there is a need to incrementally deploy ILNP breakout in a cellular communication network.

Embodiments disclosed herein enable incremental deployment of ILNP breakout in a 5G cellular communications network. The embodiments adapt 5G session and service continuity (SSC) mode 2 as a model for introduction and refer to it as the ILNP SSC mode. SSC mode 2 is a network initiated UPF change with an address change. The ILNP SSC mode is defined as a UE initiated UPF change with an address change. The embodiments define the concept of a packet data network (PDN) session type exclusively for ILNP traffic. A UE can have a non-ILNP correspondent SSC mode session (typically mode 1, 2 or 3), and an ILNP correspondent session (ILNP SSC mode). The non-ILNP PDN session handles both Internet Protocol version 4 (IPv4) and non-ILNP IPv6 traffic. This permits incremental introduction side by side with the existing infrastructure of 5G networks. The embodiments integrate ILNP into mobility handoff procedures. The embodiments provide a split gateway architecture for ILNP breakout but keep the traditional architecture for IPv4 and non-ILNP IPv6 traffic. The embodiments provide distributed UPFs for ILNP IPv6. The embodiments utilize a "replacement" session, one in which the serving UPF instance and the location of the UE changes, but it is logically a continuation of the previous session. The UPFs can be collapsed right down to the gNodeB for ILNP breakout or simply placed considerably closer to the gNodeB than that for anchored mobility as no anchor points are needed, but in some deployments the supporting UPF may be placed deeper in the network. Instead, the embodiments make the control plane ILNP "aware." This indicates that the control plane has knowledge of where the ILNP capability exists, as well as, when and where it can be used. In some embodiments, IP multimedia systems (IMS) changes are utilized when domain name service (DNS) is not used.

In the embodiments, a UE can determine a correspondent is ILNP capable by any of several mechanisms including a DNS lookup of identifier and locator (I+L) records, IMS call setup that has been augmented to indicate that the correspondent is ILNP capable, an unsolicited message that includes ILNP header options, or similar mechanism. A UE in the embodiments will have two locators associated with it, specifically, one locator associated with a PDN session from the UE to a normal anchor point, and another locator associated with a PDN session to the same data network but with local breakout, used for communicating with ILNP capable peers. An ILNP capable UE when connecting to the network may be provided with a data network name (DNN) and will request two PDN sessions for that DNN with SSC modes corresponding to ILNP and non-ILNP behavior respectively. The first PDN session is used to communicate with ILNP capable correspondents. The other PDN session is for non-ILNP based communication. If the SMF or controlled UPF cannot support ILNP operation, or the policies associated with the DNN for that UE do not permit ILNP operation, then the ILNP SSC mode session request is rejected and the UE defaults to using the non-ILNP session for both ILNP and non-ILNP capable correspondents. Even if a UE cannot locally exploit ILNP operation, it can still permit ILNP capable correspondents to exploit it by continuing to advertise ILNP capability. The non-ILNP capable PDN session (e.g., using SSC modes 1 to 3) directs traffic to a traditional UPF anchor point. UEs without ILNP capability will not request an ILNP SSC mode PDN session. If a UE is unsuccessful in establishing an ILNP SSC mode session, then an ILNP capable UE forwards all traffic via the existing non-ILNP access points as per network policy. A UE in a visited network also forwards traffic via existing non-ILNP access points where there was no local breakout. When choosing between ILNP and non-ILNP sessions, the UE will select which session to use on the basis of DNS lookups, ILNP header and/or other similar options. If the peer is ILNP capable, then the UE will send traffic via the ILNP SSC mode PDN session; if the peer is not ILNP capable, then the UE sends via the non-ILNP PDN session.

Figure 2:
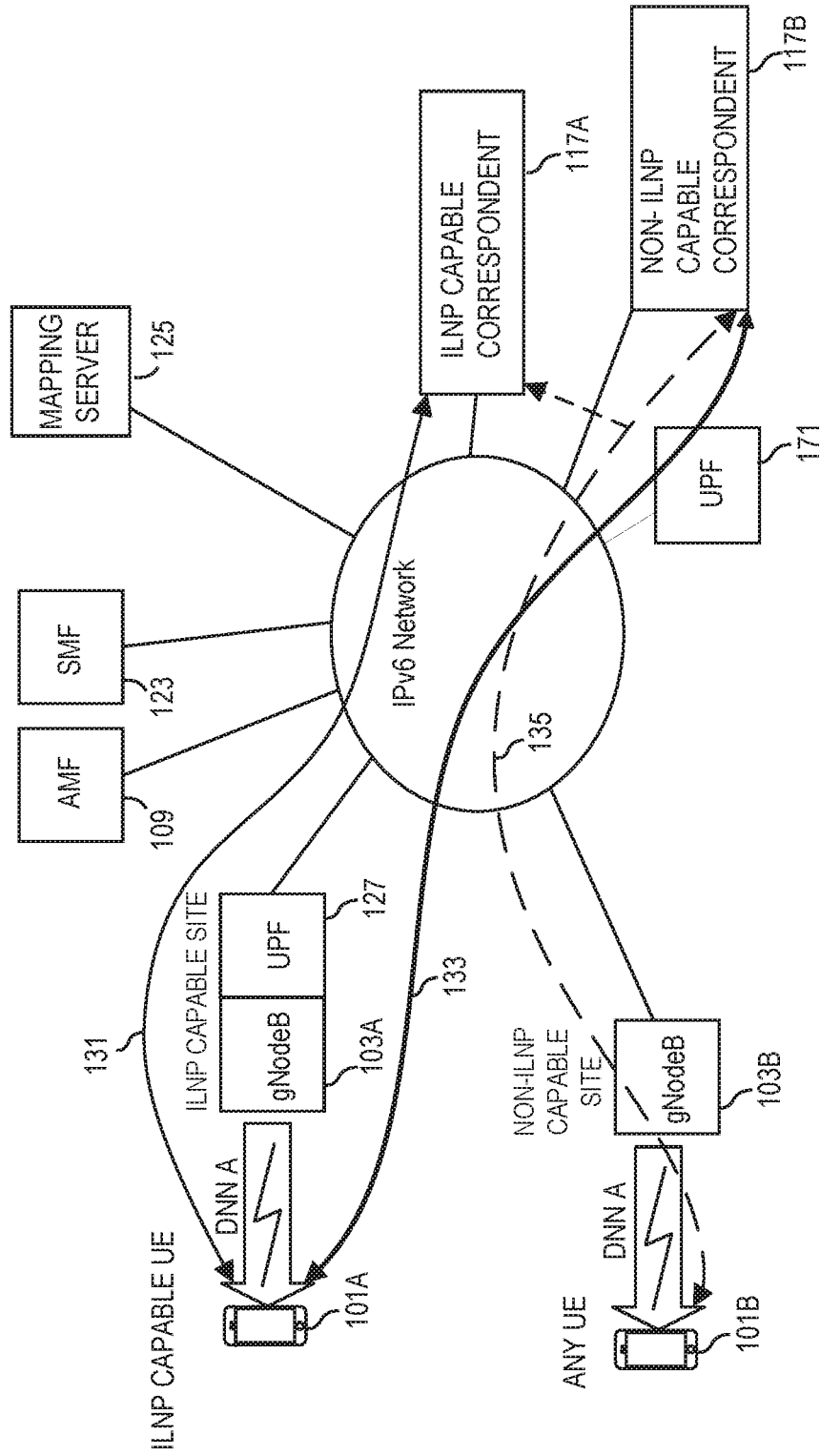
FIG. 2 is a diagram of one embodiment of a 5G network architecture incremental deployment of ILNP breakout, according to some embodiments.

FIG. 2 is a diagram of one embodiment of a 5G network architecture with distributed UPFs implementing an ILNP SSC mode capability that enables incremental deployment of ILNP breakout. The exemplary network architecture shown in the diagram enables the UEs 101A, B to communicate with the CNs 117A, B. The network architecture includes an ILNP capable UE 101A that is connected to gNodeB 103A. The gNodeB 103A has a co-located UPF 127 that supports ILNP breakout capability. The UPF 127 may apply policies, implement quality of service (QoS), perform regulatory functions (e.g., legal intercept), and perform other user plane functions typically performed by UPFs in a traditional 5G network architecture. The UPF 127 is controlled by an SMF 123. The SMF 123 may respectively control one or several corresponding UPFs 127 co-located at the gNodeBs 103. The example 5G network architecture also includes a UE 101B that is connected to gNodeB 103B, which does not have co-located ILNP breakout capability. UE 101B may or may not be ILNP capable. For purposes of simplicity and clarity, the 5G network architecture is shown as including a single ILNP breakout capable gNodeB 103A and a single non-ILNP breakout capable gNodeB 103B. It should be understood, however, that the 5G network architecture can include additional gNodeBs 103.

The 5G network architecture also includes additional components and entities such as access and mobility management function (AMF) 109, and similar components. These entities perform the same functions as performed in most other 5G network architectures. The 5G network architecture also includes a mapping server 125 that stores identifiers and locators for nodes (which the UE 101 or other entity can use to look up the identifier and locator for a particular node). In one embodiment, the mapping server 125 is a domain name server (DNS) server (e.g., for general Internet access) or an IMS server (e.g., for telephony).

As shown in the diagram, the UE 101A upon registration is provided a DNN list that it has subscribed to, in this case the list is a single DNN 'A.' Associated with the DNN may be the permissible non-ILNP SSC modes. The UE may also be provided with an indication that the local gNodeB is ILNP capable. The UE will establish a PDN session to the DNN using a non-ILNP SSC mode and will establish a PDN session to the DNN using the ILNP SSC mode. The UE 101 may then select a different PDN session to use when communicating with a CN 117 depending on whether the CN 117 is ILNP capable. For example, the UE 101A may communicate with ILNP capable CN 117A using one PDN session, which directs traffic over a datapath 131 that goes through UPF 127. However, UE 101A may communicate with non-ILNP capable CN 117B using another PDN session, which directs traffic over datapath 133 that goes through an anchor point. A UE 101 may determine whether a CN 117 is ILNP capable based on looking up the CN 117 in the mapping server 125 (e.g., where the mapping server is a DNS server) or based on information in a packet received from the CN 117 indicating that the CN 117 is ILNP capable (e.g., in a header of the packet). In this way, the UE 101A takes advantage of ILNP breakout capabilities when communicating with an ILNP capable CN 117A but uses traditional network access mechanisms (via anchor points) when communicating with a non-ILNP capable CN 117B or for IPv4 traffic, which allows for the incremental deployment of ILNP breakout.

In contrast to the UE 101A, the UE 101B is attached to the gNodeB 103B that does not have ILNP breakout capability. Thus, the UE 101B will not be able to establish a PDN session that uses the ILNP SSC mode or will have the session directed to an anchor point UPF by SMF procedures. The UE 101B communicates with ILNP capable CN 117A and non-ILNP capable CN 117B using this PDN session, which directs traffic over datapath 135 that goes through anchor points. It should be noted that if UE 101B is ILNP capable, then it may still communicate with ILNP capable CN using ILNP so if the UE moves to another location being served by a gNodeB that does support ILNP breakout, then ILNP mobility procedures will permit a resumption of the efficiencies of local ILNP breakout in serving ILNP traffic.

In order to initiate an ILNP communication session with a CN 117, a UE 101 or other end system needs to know whether the CN 117 is ILNP capable. In one embodiment, the UE 101 consults with the mapping server 125 to determine whether a CN 117 is ILNP capable. For example, the mapping server may be a DNS server and the UE 101 may retrieve a DNS record corresponding to the CN 117 to determine whether the CN 117 is ILNP capable. In mobile broadband, DNS is not the only mechanism used to resolve peers (e.g., there is Session Initiation Protocol (SIP) exchange based on telephony identifiers). For purposes of this disclosure, it is assumed that at the time the UE 101 desires to initiate communication with a CN 117, it has a mechanism to know whether the CN 117 is ILNP capable (e.g., by consulting a mapping server or via telephony signaling). It should be noted that whether the CN is ILNP capable and whether the UE will use ILNP procedures in communicating with ILNP capable correspondents is independent of whether ILNP breakout is available.

A UE 101 (e.g., UE 101A) that has established multiple PDN sessions effectively has multiple bearers. For functionally equivalent connectivity to both the ILNP breakout PDN session and the traditional PDN session, the Service Data Flow (SDF) templates for both may be the same. Also, the AMF 109 may need to know the location of the UE 101 for tracking and paging purposes. Thus, in one embodiment, the UE 101 registers with the AMF 109.

In a cellular communication network, a UE 101 may change the gNodeB 103 to which it connects as it moves about geographically. The process of switching between gNodeBs 103 is generally referred to as a handover process. During incremental deployment of ILNP breakout, the cellular communication network may include gNodeBs 103 that have ILNP breakout capability as well as gNodeBs 103 that do not have ILNP breakout capability. Thus, the UE 101 may be handed over between gNodeBs that have ILNP breakout capability, between gNodeBs that do not have ILNP breakout capability, and between a gNodeB that has ILNP breakout capability and a gNodeB that does not have ILNP breakout capability, and vice versa. Existing X2 assisted handover may not be applicable or may need to be modified to support seamless handover for these various scenarios without losing session continuity or providing a discontinuity in traffic delivery. The handover process for these various scenarios are shown in FIGS. 3A-C and described herein below.

Figure 3A:
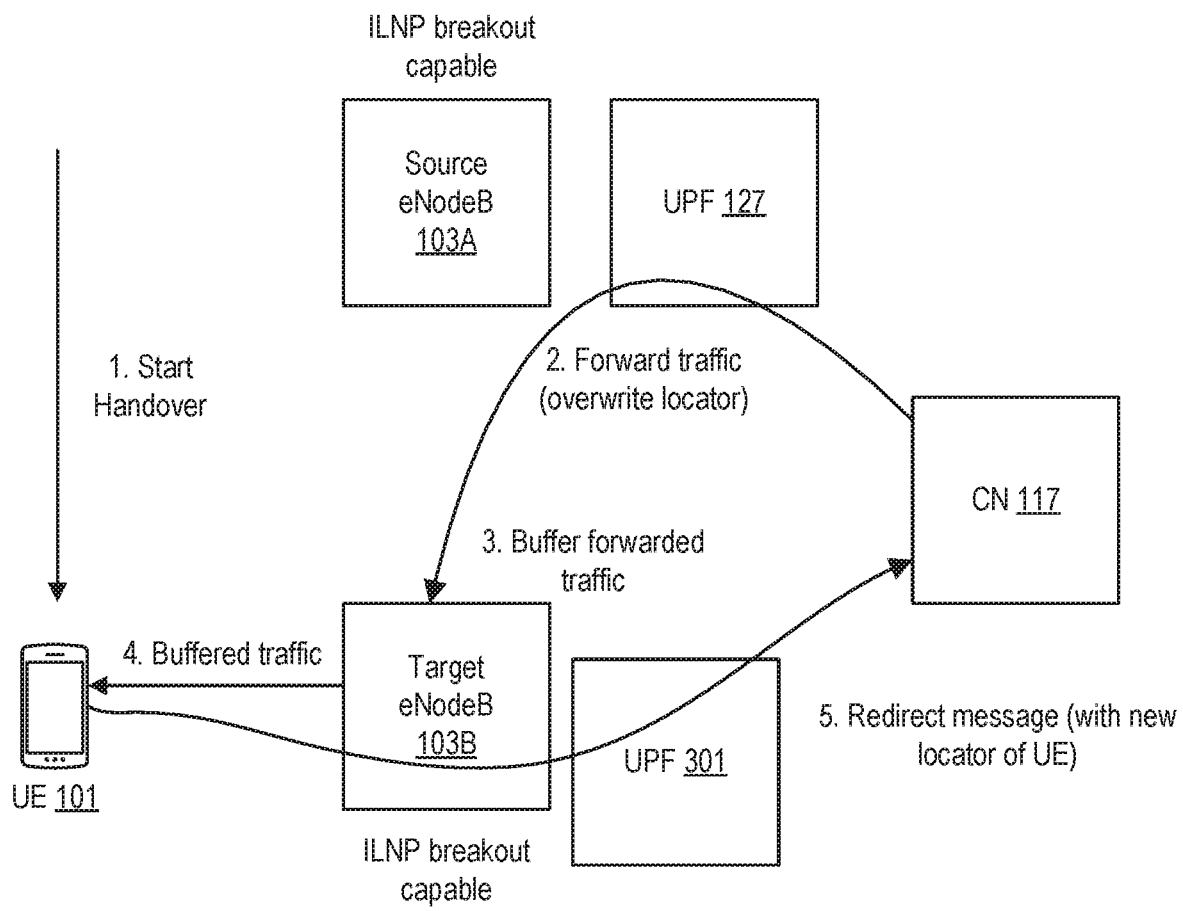
FIG. 3A is a diagram of one embodiment illustrating operations of a handover process when a UE is handed over between gNodeBs that have ILNP breakout capability, according to some embodiments.

FIG. 3A is a diagram illustrating operations of a handover process when a UE is handed over between gNodeBs that have ILNP breakout capability, according to some embodiments. At operation 1, the UE 101 triggers the handover process when it moves from the source gNodeB 103A toward the target gNodeB 103B, where both the source gNodeB 103A and the target gNodeB have ILNP breakout capability. As a result, the UE 101 disconnects from the source gNodeB 103A and starts connecting to the target gNodeB 103B. Even after the UE 101 disconnects from the source gNodeB 103A, the CN 117 continues to send traffic for the UE 101 to the source UPF 127 (since it may not yet know that the UE 101 has moved). At operation 2, the source UPF 127 forwards traffic for the UE 101 to the target UPF 301 by overwriting the locator (e.g., in the header of a packet) with a locator associated with the target UPF 301. The target UPF forwards the traffic to the target gNodeB 103B. At operation 3, the target gNodeB 103B buffers the forwarded traffic. At operation 4, the target gNodeB 103B sends the buffered traffic to the UE 101. At operation 5, the UE 101 sends a redirect message (e.g., Internet Control Message Protocol (ICMP) redirect message) to the CN 117 that indicates that UE 101 can be reached using its new locator (which may be the same as the locator associated with the target UPF 301 that was used to overwrite the locator at operation 2, depending on implementation).

Figure 3B:
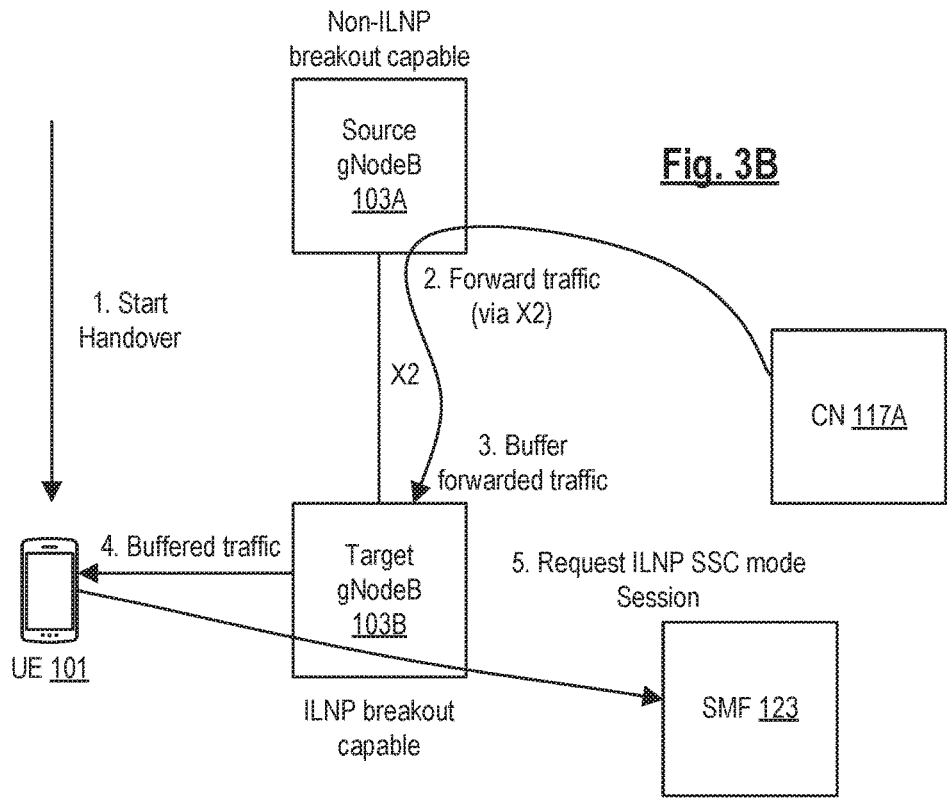
FIG. 3B is a diagram of one embodiment illustrating operations of a handover process when a UE is handed over from a gNodeB that does not have ILNP breakout capability to a gNodeB that has ILNP breakout capability, according to some embodiments.

FIG. 3B is a diagram illustrating operations of a handover process when a UE is handed over from a gNodeB that does not have ILNP breakout capability to a gNodeB that has ILNP breakout capability, according to some embodiments. At operation 1, the UE 101 triggers the handover process when it moves from the source gNodeB 103A toward the target gNodeB 103B, where the source gNodeB 103A does not have ILNP breakout capability and the target gNodeB 103B has ILNP breakout capability. As a result, the UE 101 disconnects from the source gNodeB 103A and starts connecting to the target gNodeB 103B. Even after the UE 101 disconnects from the source gNodeB 103A, the CN 117 continues to send traffic for the UE 101 to the source gNodeB 103A (since it may not yet know that the UE 101 has moved). At operation 2, the source gNodeB 103A forwards traffic for the UE 101 to the target gNodeB 103B over an X2 tunnel. At operation 3, the target gNodeB 103B buffers the forwarded traffic. At operation 4, the target gNodeB 103B sends the buffered traffic to the UE 101. At operation 5, the UE requests an ILNP SSC mode session to the DNN by a request to the SMF sent via the AMF. Upon completion of session setup, at operation 6, the UE 101 sends a redirect message (e.g., ICMP Redirect message) to the CN 117 that indicates that the UE 101 can be reached using its new locator associated with a re-established ILNP SSC mode session.

Figure 3C:
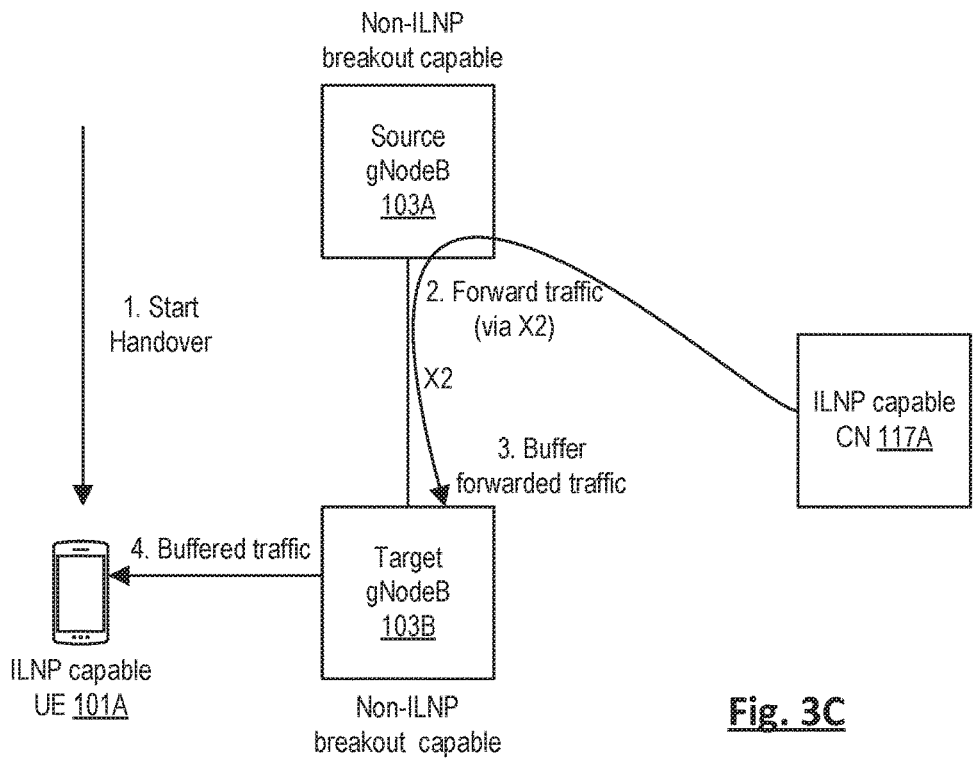
FIG. 3C is a diagram of one embodiment illustrating operations of a handover process when a UE is handed over between gNodeBs that do not have ILNP breakout capability, according to some embodiments.

FIG. 3C is a diagram illustrating operations of a handover process when a UE is handed over between gNodeBs that do not have ILNP breakout capability, according to some embodiments. The operations of this handover process remain the same as the X2 assisted handover process employed in traditional 3GPP architectures. At operation 1, the UE 101 triggers the handover process when it moves from the source gNodeB 103A toward the target gNodeB 103B, where both the source gNodeB 103A and the target gNodeB do not have ILNP breakout capability. As a result, the UE 101 disconnects from the source gNodeB 103A and starts connecting to the target gNodeB 103B. Even after the UE 101 disconnects from the source gNodeB 103A, the CN 117 continues to send traffic for the UE 101 to the source gNodeB 103A (since it may not yet know that the UE 101 has moved). At operation 2, the source gNodeB 103A forwards traffic for the UE 101 to the target gNodeB 103B over an X2 tunnel. At operation 3, the target gNodeB 103B buffers the forwarded traffic. At operation 4, the target gNodeB 103B sends the buffered traffic to the UE 101. It should be noted that in this scenario, the locator for the UE 101 does not change and thus the UE 101 does not need to send a redirect message to the CN 117 (even if it is communicating with the CN 117 using ILNP).

FIG. 4 is a diagram of one embodiment of a handover call flow. The call flow primarily illustrates the entities and calls involved in the ILNP handover. Thus, other entities and calls related to the overall handover process may not be illustrated for sake of clarity. As is common and well understood practice, transactions may be acknowledged, and if a transaction initiator does not receive an acknowledgement in a specified time interval, the transaction initiator can retry the transaction. This can repeat for a specified number of times before the operation is considered to have failed.

UE 101 is initially connected to source gNodeB 103A and communicates with CN 117 over a datapath that goes through source gNodeB 103A and source UPF 127. Subsequently, source gNodeB 103A determines that the UE 101 is to be handed over to the target gNodeB 103B (i.e., the source gNodeB 103A makes a handover decision). In response to determining that the UE 101 is to be handed over to the target gNodeB 103B, the source gNodeB 103A begins a handover preparation process. In some embodiments, the source gNodeB 103A sends an augmented X2 Handoff message to the target gNodeB 103B. Based on receiving the augmented X2 Handoff message, the target gNodeB 103B may know to expect traffic destined for the UE 101. The augmented X2 Handoff message may include information regarding radio access bearer (RAB), quality of service (QoS), ILNP breakout capability, and policy filters (e.g., downstream service filters). A session at the target gNodeB is set up. In some embodiments, the target gNodeB 103B requests a parallel session to be set up using a path setup request to the AMF 109. The AMF 109 relays the request to the SMF 123. The SMF 123 selects a target UPF 151 that may be co-located with the target gNodeB 103B, or in scenarios where the target UPF 151 may not be directly co-located with the target gNodeB 103B, and in some scenarios may not be required to change to support the handover. When a change is required, the target UPF 151 is programmed with session state to mirror the source UPF 127 by the SMF 123 (e.g., using the N4 session). The SMF 123 initiates session setup between the target gNodeB 103B and the target UPF 151. Upon completion of the session setup, the SMF 123 then provides a locator for the target UPF 151 to the source UPF 127 for redirecting traffic. The target gNodeB 103B responds to the augmented X2 Handoff message by sending an augmented X2 Handoff Acknowledgement (ACK) message to the source gNodeB 103A. The SMF 123 communicates to the source gNodeB 103A as relayed by the AMF 109 that the session is ready for handover. The source gNodeB 103A communicates with the UE 101 to initiate the actual handover.

After the UE 101 has disconnected from the source gNodeB 103A, the CN 117 continues to send traffic destined for the UE 101 to the source UPF 127 over the downstream datapath (since it may not yet know that the UE 101 has moved). The source UPF 127 forwards this traffic to the target UPF 151 by overwriting the locator (e.g., in a packet header). The target UPF 151 forwards the traffic to the target gNodeB 103B. The target gNodeB 103B knows that the UE 101 is going to connect with the target gNodeB 103B so the target gNodeB 103B buffers the forwarded traffic until the UE 101 connects. At this point, the target UPF 151 may have an upstream datapath to the CN 117. The UE 101 then disconnects from the source gNodeB 103A. Subsequently, the UE 101 synchronizes and connects to the target gNodeB 103B. Once the UE 101 connects to the target gNodeB 103B, the target gNodeB 103B sends the buffered traffic to the UE 101. Also, the target gNodeB 103B sends a path switch message directed to the SMF 123 indicating that the source UPF session can be discontinued. This path switch message is forwarded to the AMF 109 and then to the SMF 123.

The SMF 123 sends a locator to the UE 101 via the target UPF 151. This will typically be in the form of a stateless auto-configuration (SLAAC) router advertisement (RA). The UE 101 notes if the locator for the session has changed, and if so then sends an ICMP redirect message to the CN 117 that indicates that the UE 101 can now be reached via target UPF 151. The UE 101 may have remembered the CN 117 it was communicating with based on information stored in the UE's 101 Identifier Locator Communication Cache (ILCC) (ILCC is an ILNP construct that tracks the set of CNs 117, their IDs, session nonces, and other relevant state (e.g., timers for redirect ACKs)). The CN 117 responds by sending an ICMP redirect ACK message to the UE 101. The UE 101 can then communicate with the CN 117 over a datapath that goes through the target gNodeB 103B and handover is complete. The SMF 123 can message the source UPF 127 to release session resources.

It is also possible to envision other scenarios that have mobility implications without a handoff having occurred. For example, this would be when a UE 101 goes idle and changes locations while idle. In this scenario, it would be possible that a UPF 127 received a packet directed to a UE 101 not connected to the network. In this scenario, the UPF 127 may buffer the packet and request the SMF 123 for a location to forward the packet to. If the UE 101 is still idle, the SMF 123 may initiate paging procedures to wake up the UE 101, and advise the UPF 127 of the resulting location of the UE 101. If the new location was not local to the UPF 127, the UPF 127 may perform prefix modification on the buffered packet, and then forward it to the appropriate UPF for delivery to the UE 101.

It is possible to also consider various race conditions such that packets are relayed to a UE 101 by the network on the basis of stale information combined with either handoff or paging procedures. The nature of the forwarding mechanism is such that the fact that the packet was sent via a stale locator is hidden from the UE 101. For existing CNs 117, the normal ILNP procedures of sending an ICMP Redirect message will address the locator freshness issue. As a part of this embodiment, UEs 101 may send an ICMP Redirect message to all new CNs 117 to ensure that the CNs have fresh locator information in their respective ILCCs.

Figure 5:
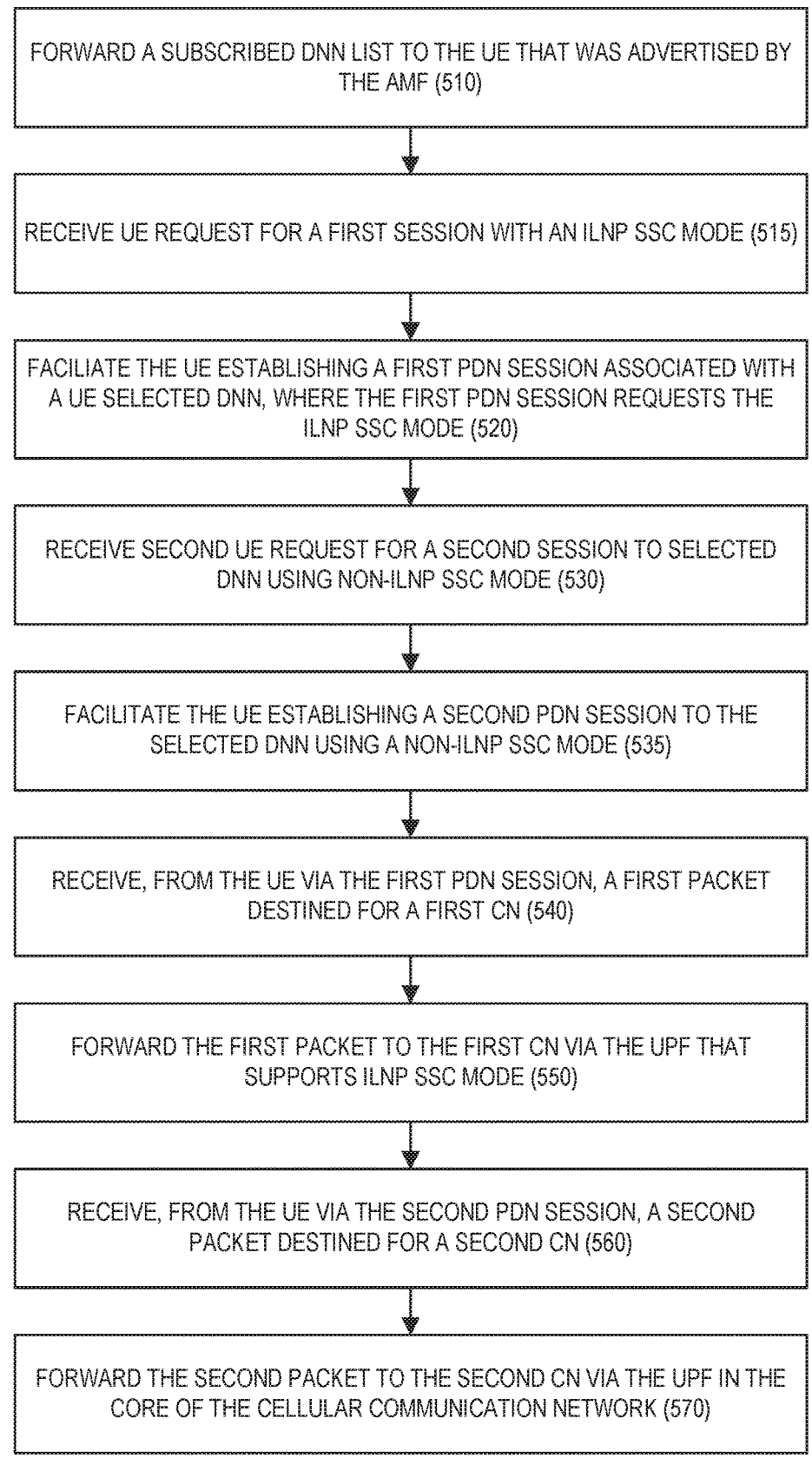
FIG. 5 is a flow diagram of one embodiment of a process performed by a gNodeB to support incremental deployment of ILNP breakout, according to some embodiments.

FIG. 5 is a flow diagram of a process performed by a gNodeB to support incremental deployment of ILNP breakout, according to some embodiments. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 510, the gNodeB 103 forwards an AMF 109 advertised subscribed DNN list to a UE 101. At block 515, the gNodeB 103 receives a request from the UE 101 for a first session associated with the selected DNN where the UE requests an ILNP SSC mode. At block 520, the gNodeB (along with the AMF and SMF) facilitates the UE 101 establishing a first PDN session associated with a UE 101 selected DNN, where the first PDN session requests the ILNP SSC mode. At block 530, the UE 101 requests a second session and the gNodeB (along with AMF and SMF) facilitates the UE 101 establishing a second PDN session to the selected DNN using a non-ILNP SSC mode (block 535). At block 540, the gNodeB 103 receives, from the UE 101 via the first PDN session, a first packet destined for a first CN 117A (the first CN 117A may be a CN 117 that the UE 101 determined is ILNP capable). At block 550, the gNodeB 103 forwards the first packet to the first CN 117A via the UPF 127 where the UPF 127 supports the ILNP SSC mode. At block 560, the gNodeB 103 receives, from the UE 101 via the second PDN session, a second packet destined for a second CN 117B (the second CN 117B may be a CN 117 that the UE 101 determined is not ILNP capable). At block 570, the gNodeB 103 forwards the second packet to the second CN 117B via the UPF 171 in the core of the cellular communication network.

In one embodiment, the UPF 127 receives a third packet destined for a second UE 101 that is not served by the UPF 127 (e.g., not connected to the gNodeB 103). In this case, the UPF 127 may query an SMF 123 for a locator of the second UE 101. The UPF 127 may then receive a reply from the SMF 123 indicating the locator of the second UE 101 (e.g., AMF 109 may determine the locator of the second UE 101 based on performing paging procedures). The UPF 127 may then overwrite a destination locator in a header of the third packet with the locator received from the SMF 123 and forward the third packet.

Figure 6A:
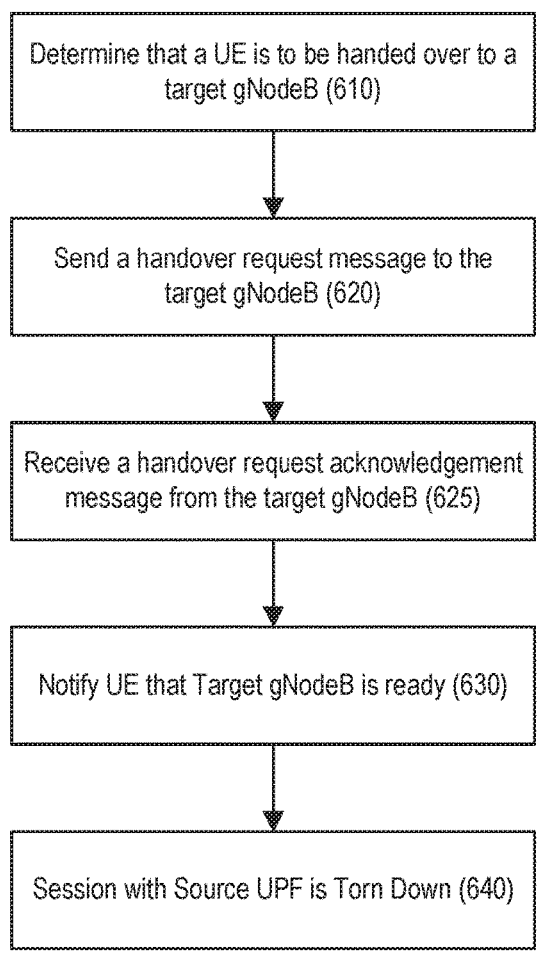
FIG. 6A is a flow diagram of one embodiment of a handover process performed by a source gNodeB, according to some embodiments.

FIG. 6A is a flow diagram of a handover process performed by a source gNodeB, according to some embodiments. At block 610, the source gNodeB 103A determines that a UE 101 is to be handed over to a target gNodeB 103B. The determination can be based on a notification received from the UE 101 or other component that identifies a target gNodeB 103B. At block 620, the source gNodeB 103A sends a handover request message to the target gNodeB 103B (which indicates that UE 101 is to be handed over to the target gNodeB 103B). The handover request message may include information regarding radio access bearer (RAB), quality of service (QoS), ILNP breakout capability, and policy filters (e.g., downstream SDF filter). At Block 625, the source gNodeB 103A may receive a handover request acknowledgement message from the target gNodeB 103B if the target gNodeB 103B successfully receives the handover request message. The source gNodeB 103A then notifies the UE that the target gNodeB 103B is ready for the handover, at block 630. After this point, the UE 101 will disconnect from the source gNodeB and the session between the UE 101 and the source gNodeB can be torn down, at block 640.

Figure 6B:
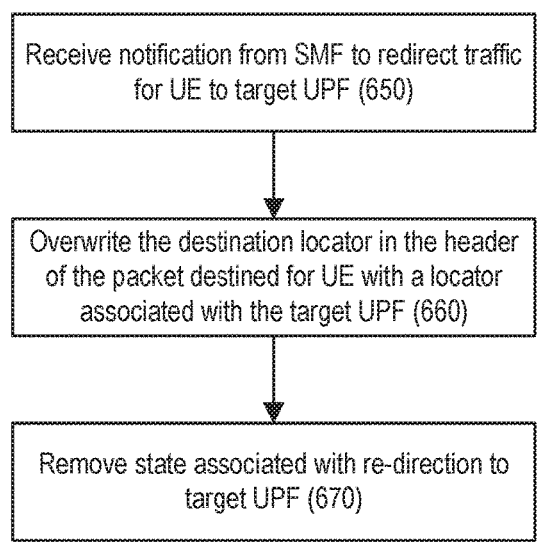
FIG. 6B is a flow diagram of one embodiment of a handover process performed by a source UPF, according to some embodiments.

FIG. 6B is a flowchart of one embodiment of a handover process implemented by the source UPF 127. At block 650, the source UPF 127 receives notification from the SMF 123 to redirect traffic for the UE 101 to a target UPF. The notification can include the locator or similar information for the target UPF. At block 660, the source gNodeB 103A forwards the downstream packets for the UE 101 to the target gNodeB 103B using the locator of the target gNodeB 103B. The SMF 123 can request or extract information from the source UPF 127 related to accounting and policies that are to be taken over by the target UPF. Upstream data traffic from the UE 101 can continue to be received by the source UPF 127 until handover is completed and this upstream data traffic is forwarded accordingly. The start of the redirection of the traffic intended for the UE 101 can initiate a timer at the source UPF 127, and after the expiration of the timer at block 670, the source UPF 127 ends the redirection of the traffic for the UE and removes the sessions state associated with the redirection to the target UPF/gNodeB. Alternatively, the SMF 123 can send a message to end the redirection to the source UPF 127.

Figure 7:
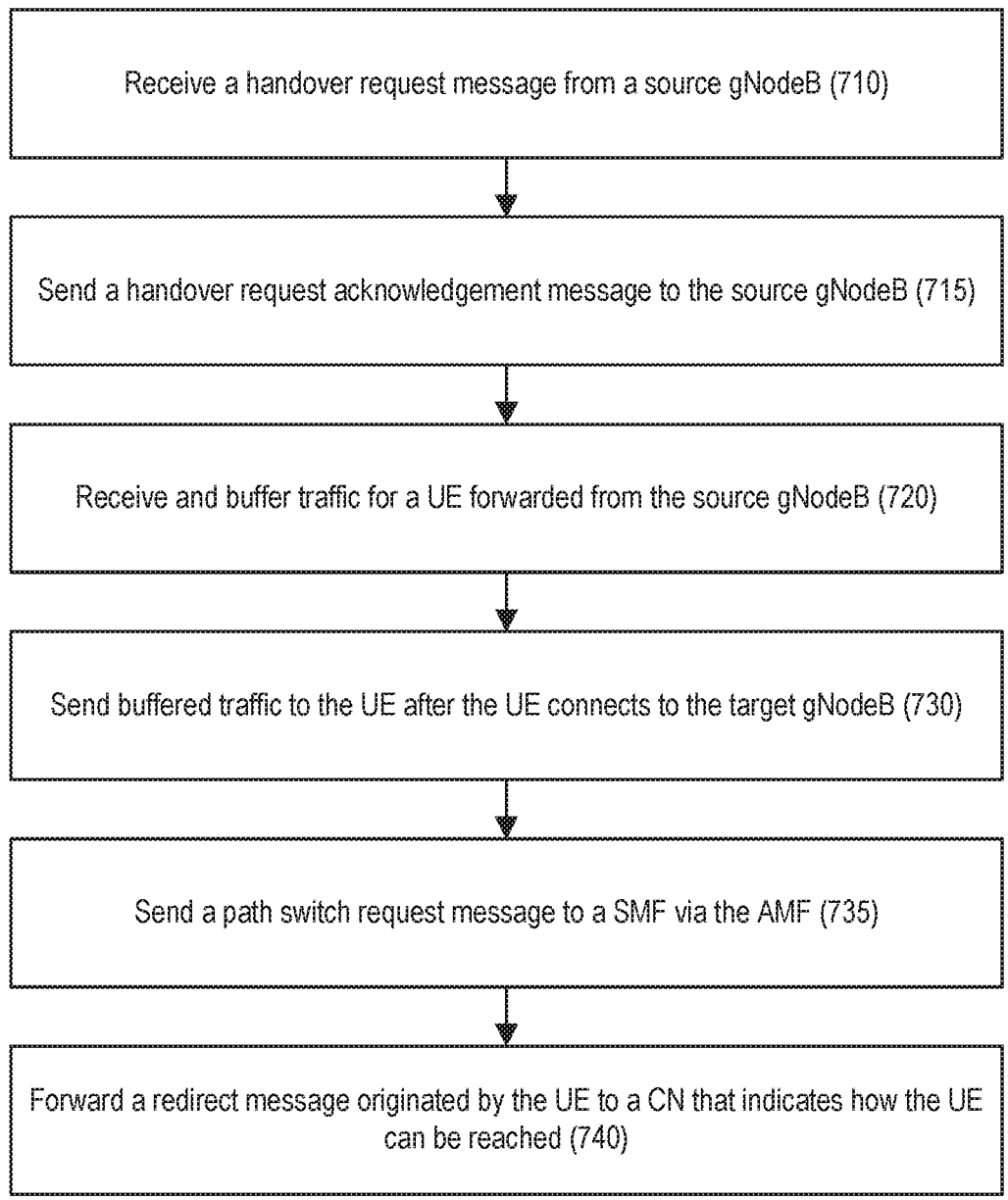
FIG. 7 is a flow diagram of a handover process performed by a target gNodeB, according to some embodiments.

FIG. 7 is a flow diagram of a handover process performed by a target gNodeB, according to some embodiments. At block 710, the target gNodeB 103B receives a handover request message (e.g., an augmented X2 Handoff message) from a source gNodeB 103A. In response, at block 715, the target gNodeB 103B sends a handover request acknowledgement message (e.g., an augmented X2 Handoff ACK message) to the source gNodeB 103A. In one embodiment, the handover request acknowledgement message includes information regarding whether the target gNodeB 103B has ILNP breakout capability. The target gNodeB 103B coordinates session set up via the SMF 123 with the target UPF 151. At block 720, the target gNodeB 103B receives and buffers traffic for a UE 101 forwarded from the source UPF 127. At block 730, the target gNodeB 103B sends buffered traffic to the UE 101 after the UE 101 connects to the target gNodeB 103B and local session with the target UPF 151. At block 735, the target gNodeB 103B sends a path switch request message to the SMF 123 via an AMF 109. The path switch request message may inform the AMF 109 of the new locator of the UE 101 (and possibly the tracking area (TA) for the UE 101). At block 740, the target gNodeB 103B relays a redirect message originated by the UE 101 to a CN 117 that indicates how the UE 101 can be reached.

Figure 8:
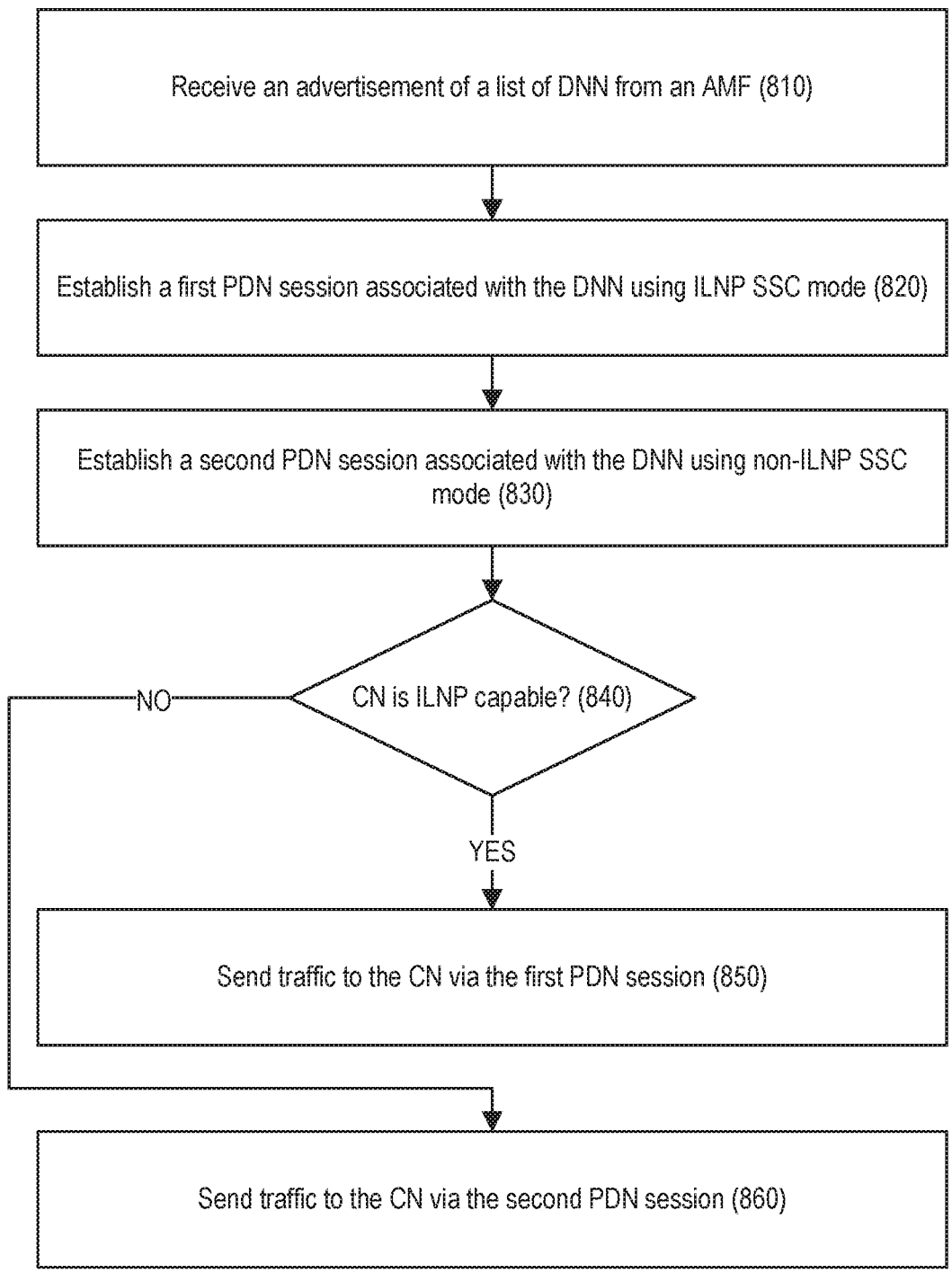
FIG. 8 is a flow diagram of a process performed by a UE to support incremental deployment of ILNP breakout, according to some embodiments.

FIG. 8 is a flow diagram of a process performed by a UE to support incremental deployment of ILNP breakout, according to some embodiments. At block 810, the UE 101 receives an advertisement of a list of DNN from an AMF 109. At block 820, the UE 101 establishes a first PDN session associated with a DNN selected from the list of DNN, where the first PDN session uses the ILNP SSC mode. In one embodiment, the UE 101 is provided with a locator to use for communicating via the first PDN session. At block 830, the UE 101 establishes a second PDN session associated with the DNN using the non-ILNP SSC mode. In one embodiment, the UE 101 is provided with either a prefix or IPv6 address to use for communicating via the second PDN session. At decision block 840, the UE 101 determines whether a CN 117 is ILNP capable. In one embodiment, the UE 101 determines whether the CN 117 is ILNP capable based on looking up information about the CN 117 in a mapping server 125 (e.g., DNS server). If the CN 117 is ILNP capable, then at block 850, the UE 101 sends traffic to the CN 117 via the first PDN session using ILNP procedures. However, if the CN 117 is not ILNP capable, then at block 860, the UE 101 sends traffic to the CN 117 via the second PDN session. In one embodiment, the UE 101 initially attempts to establish ILNP communication with the CN 117 via the second PDN session associated with the DNN (i.e., the non-ILNP SSC mode session). If this succeeds (which indicates that the CN 117 is ILNP capable), the UE 101 may switch to using the first PDN session associated with the ILNP SSC mode to communicate with the CN 117. In one embodiment, the UE 101 sends, to all CNs 117 that initiate sessions with the UE 101, a redirect message that indicates how the UE 101 can be reached (e.g., to ensure that all CNs 117 have fresh locator information in their respective ILCCs).

Figure 9:
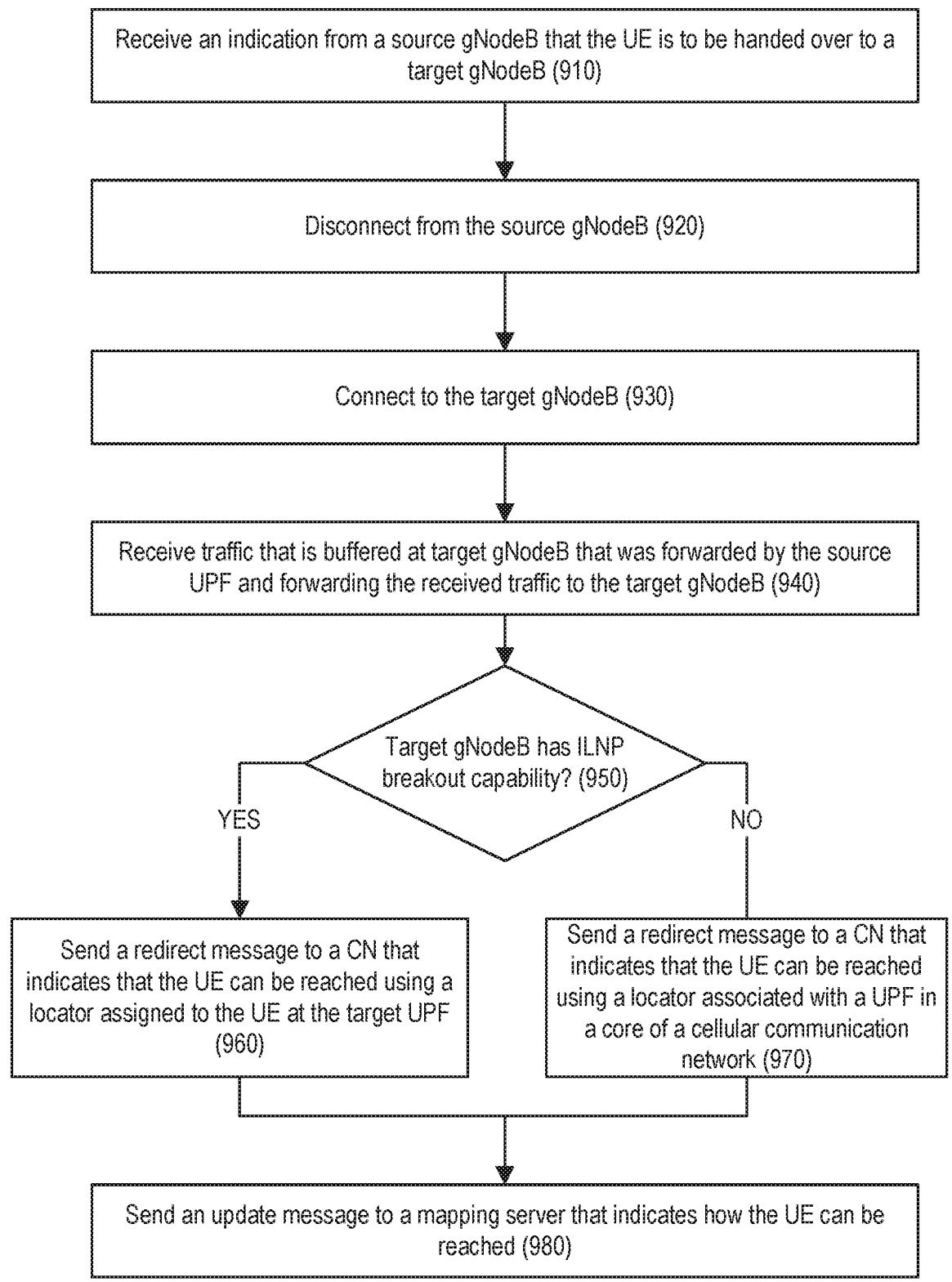
FIG. 9 is a flow diagram of a handover process performed by a UE, according to some embodiments.

FIG. 9 is a flow diagram of a handover process performed by a UE, according to some embodiments. At block 910, the UE 101 receives an indication from a source gNodeB 103A that the UE 101 is to be handed over to a target gNodeB 103B. At block 920, the UE 101 disconnects from the source gNodeB 103A. At block 930, the UE 101 connects to the target gNodeB 103B. In one embodiment, the UE 101 connects to the target gNodeB 103B before disconnecting from the source gNodeB 103A. At block 940, the UE 101 receives traffic that had been buffered at the target gNodeB 103B that was forwarded by the source UPF 127. At decision block 950, the UE 101 determines whether the target gNodeB 103B has ILNP breakout capability. In one embodiment, the UE 101 determines whether the target gNodeB 103B has ILNP breakout capability based on acceptance of an ILNP SSC mode session establishment. If the target gNodeB 103B has ILNP breakout capability, then at block 960, the UE 101 sends a redirect message to a CN 117 that indicates that the UE 101 can be reached using a locator assigned to the UE 101 at the target UPF 151. However, if the target gNodeB 103B does not have ILNP breakout capability, then at block 970, the UE 101 sends a redirect message to a CN 117 that indicates that the UE 101 can be reached using a locator associated with a UPF 171 in a core of a cellular communication network. In one embodiment, the redirect message is an ICMP Redirect message. At block 980, the UE 101 sends an update message to a mapping server 125 that indicates how the UE 101 can be reached.

In an alternate embodiment, the SMF simply selects a non-local anchor point UPF 171 for the ILNP SSC mode session, and the UE itself is unaware that ILNP breakout capability is not locally available at the target gNodeB 103B.

An advantage of embodiments disclosed herein is that they enable incremental deployment of ILNP breakout, while preserving key aspects of the business interfaces of the 5G architecture. Also, changes to the network are mostly confined to the UE 101, 5G architecture components, and the end system stacks in CNs 117. That is, there is no additional device added to the middle of the network to enable the solution. The overhead of tunneling is eliminated or reduced for ILNP capable CNs 117. Also, embodiments disclosed herein allow a mobile carrier to control the pace of transition (e.g., force voice over long term evolution (VoLTE) over the traditional datapath with anchor points).

It is also possible to consider other embodiments consistent with 5G Core procedures, such as a network initiated UPF change for an ILNP SSC mode, or an SMF change coordinated with a UE initiated UPF change.

Figure 10A:
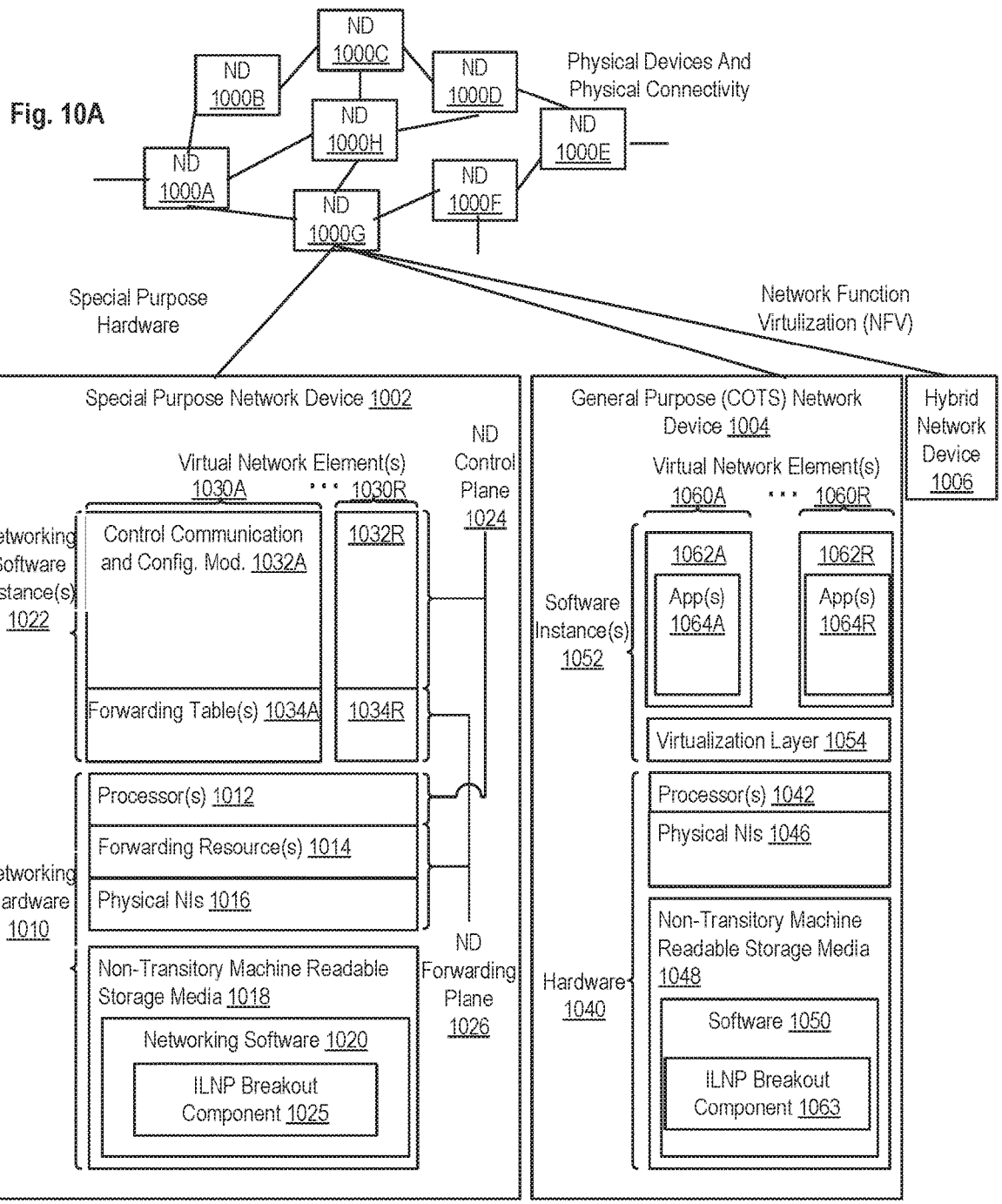
FIG. 10A illustrates connectivity between network devices (NDs) within an exemplary network, as well as three exemplary implementations of the NDs, according to some embodiments.

FIG. 10A illustrates connectivity between network devices (NDs) within an exemplary network, as well as three exemplary implementations of the NDs, according to some embodiments of the invention. FIG. 10A shows NDs 1000A-H, and their connectivity by way of lines between 1000A-1000B, 1000B-1000C, 1000C-1000D, 1000D-1000E, 1000E-1000F, 1000F-1000G, and 1000A-1000G, as well as between 1000H and each of 1000A, 1000C, 1000D, and 1000G. These NDs are physical devices, and the connectivity between these NDs can be wireless or wired (often referred to as a link). An additional line extending from NDs 1000A, 1000E, and 1000F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application-specific integrated-circuits (ASICs) and a special-purpose operating system (OS); and 2) a general-purpose network device 1004 that uses common off-the-shelf (COTS) processors and a standard OS.

The special-purpose network device 1002 includes networking hardware 1010 comprising a set of one or more processor(s) 1012, forwarding resource(s) 1014 (which typically include one or more ASICs and/or network processors), and physical network interfaces (NIs) 1016 (through which network connections are made, such as those shown by the connectivity between NDs 1000A-H), as well as non-transitory machine readable storage media 1018 having stored therein networking software 1020. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A).

Software 1020 can include code such as ILNP breakout component 1025, which when executed by networking hardware 1010, causes the special-purpose network device 1002 to perform operations of one or more embodiments of the present invention as part networking software instances 1022.

The special-purpose network device 1002 is often physically and/or logically considered to include: 1) a ND control plane 1024 (sometimes referred to as a control plane) comprising the processor(s) 1012 that execute the control communication and configuration module(s) 1032A-R; and 2) a ND forwarding plane 1026 (sometimes referred to as a forwarding plane, a user plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the processor(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

Figure 10B:
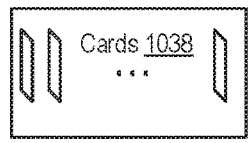
FIG. 10B illustrates an exemplary way to implement a special-purpose network device according to some embodiments.

FIG. 10B illustrates an exemplary way to implement the special-purpose network device 1002 according to some embodiments of the invention. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general-purpose network device 1004 includes hardware 1040 comprising a set of one or more processor(s) 1042 (which are often COTS processors) and physical NIs 1046, as well as non-transitory machine-readable storage media 1048 having stored therein software 1050. During operation, the processor(s) 1042 execute the software 1050 to instantiate one or more sets of one or more applications 1064A-R. While one embodiment does not implement virtualization, alternative embodiments may use different forms of virtualization. For example, in one such alternative embodiment the virtualization layer 1054 represents the kernel of an operating system (or a shim executing on a base operating system) that allows for the creation of multiple instances 1062A-R called software containers that may each be used to execute one (or more) of the sets of applications 1064A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1054 represents a hypervisor (sometimes referred to as a virtual machine monitor (VMM)) or a hypervisor executing on top of a host operating system, and each of the sets of applications 1064A-R is run on top of a guest operating system within an instance 1062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1040, directly on a hypervisor (in which case the unikernel is sometimes described as running within a LibOS virtual machine), or in a software container, embodiments can be implemented fully with unikernels running directly on a hypervisor represented by virtualization layer 1054, unikernels running within software containers represented by instances 1062A-R, or as a combination of unikernels and the above-described techniques (e.g., unikernels and virtual machines both run directly on a hypervisor, unikernels and sets of applications that are run in different software containers).

The instantiation of the one or more sets of one or more applications 1064A-R, as well as virtualization if implemented, are collectively referred to as software instance(s) 1052. Each set of applications 1064A-R, corresponding virtualization construct (e.g., instance 1062A-R) if implemented, and that part of the hardware 1040 that executes them (be it hardware dedicated to that execution and/or time slices of hardware temporally shared), forms a separate virtual network element(s) 1060A-R.

The virtual network element(s) 1060A-R perform similar functionality to the virtual network element(s) 1030A-R—e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1062A-R to VNEs also apply to embodiments where such a finer level of granularity and/or unikernels are used.

In certain embodiments, the virtualization layer 1054 includes a virtual switch that provides similar forwarding services as a physical Ethernet switch. Specifically, this virtual switch forwards traffic between instances 1062A-R and the physical NI(s) 1046, as well as optionally between the instances 1062A-R; in addition, this virtual switch may enforce network isolation between the VNEs 1060A-R that by policy are not permitted to communicate with each other (e.g., by honoring virtual local area networks (VLANs)).

Software 1050 can include code such as ILNP breakout component 1063, which when executed by processor(s) 1042, cause the general-purpose network device 1004 to perform operations of one or more embodiments of the present invention as part software instances 1062A-R.

The third exemplary ND implementation in FIG. 10A is a hybrid network device 1006, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 10C illustrates various exemplary ways in which VNEs may be coupled according to some embodiments of the invention. FIG. 10C shows VNEs 1230A.1-1230A.P (and optionally VNEs 1230A.Q-1230A.R) implemented in ND 1000A and VNE 1230H.1 in ND 1000H. In FIG. 10C, VNEs 1230A.1-P are separate from each other in the sense that they can receive packets from outside ND 1000A and forward packets outside of ND 1000A; VNE 1230A.1 is coupled with VNE 1230H.1, and thus they communicate packets between their respective NDs; VNE 1230A.2-1230A.3 may optionally forward packets between themselves without forwarding them outside of the ND 1000A; and VNE 1230A.P may optionally be the first in a chain of VNEs that includes VNE 1230A.Q followed by VNE 1230A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more such servers (e.g., in the case of the general purpose network device 1004, one or more of the software instances 1062A-R may operate as servers; the same would be true for the hybrid network device 1006; in the case of the special-purpose network device 1002, one or more such servers could also be run on a virtualization layer executed by the processor(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on an NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 10D illustrates a network with a single network element on each of the NDs of FIG. 10A, and within this straight forward approach contrasts a traditional distributed approach (commonly used by traditional routers) with a centralized approach for maintaining reachability and forwarding information (also called network control), according to some embodiments of the invention. Specifically, FIG. 10D illustrates network elements (NEs) 1230A-H with the same connectivity as the NDs 1000A-H of FIG. 10A.

FIG. 10D illustrates that the distributed approach 1232 distributes responsibility for generating the reachability and forwarding information across the NEs 1230A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1230A-H (e.g., the processor(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1232 can be implemented on the general-purpose network device 1004 and the hybrid network device 1006.

FIG. 10D illustrates that a centralized approach 1234 (also known as software defined networking (SDN)) that decouples the system that makes decisions about where traffic is sent from the underlying systems that forwards traffic to the selected destination. The illustrated centralized approach 1234 has the responsibility for the generation of reachability and forwarding information in a centralized control plane 1236 (sometimes referred to as an SDN control module, controller, network controller, OpenFlow controller, SDN controller, control plane node, network virtualization authority, or management control entity), and thus the process of neighbor discovery and topology discovery is centralized. The centralized control plane 1236 has a south bound interface 1082 with a user plane 1080 (sometime referred to the infrastructure layer, network forwarding plane, or forwarding plane (which should not be confused with a ND forwarding plane)) that includes the NEs 1230A-H (sometimes referred to as switches, forwarding elements, user plane elements, or nodes). The centralized control plane 1236 includes a network controller 1238, which includes a centralized reachability and forwarding information module 1239 that determines the reachability within the network and distributes the forwarding information to the NEs 1230A-H of the user plane 1080 over the south bound interface 1082 (which may use the OpenFlow protocol). Thus, the network intelligence is centralized in the centralized control plane 1236 executing on electronic devices that are typically separate from the NDs. In one embodiment, the network controller 1238 may include an ILNP breakout component 1081 that when executed by the network controller 1238, causes the network controller 1238 to perform operations of one or more embodiments described herein above.

For example, where the special-purpose network device 1002 is used in the user plane 1080, each of the control communication and configuration module(s) 1032A-R of the ND control plane 1024 typically include a control agent that provides the VNE side of the south bound interface 1082. In this case, the ND control plane 1024 (the processor(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1236 to receive the forwarding information (and in some cases, the reachability information) from the centralized reachability and forwarding information module 1239 (it should be understood that in some embodiments of the invention, the control communication and configuration module(s) 1032A-R, in addition to communicating with the centralized control plane 1236, may also play some role in determining reachability and/or calculating forwarding information—albeit less so than in the case of a distributed approach; such embodiments are generally considered to fall under the centralized approach 1234, but may also be considered a hybrid approach).

While the above example uses the special-purpose network device 1002, the same centralized approach 1234 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1236 to receive the forwarding information (and in some cases, the reachability information) from the centralized reachability and forwarding information module 1239; it should be understood that in some embodiments of the invention, the VNEs 1060A-R, in addition to communicating with the centralized control plane 1236, may also play some role in determining reachability and/or calculating forwarding information—albeit less so than in the case of a distributed approach) and the hybrid network device 1006. In fact, the use of SDN techniques can enhance the NFV techniques typically used in the general-purpose network device 1004 or hybrid network device 1006 implementations as NFV is able to support SDN by providing an infrastructure upon which the SDN software can be run, and NFV and SDN both aim to make use of commodity server hardware and physical switches.

FIG. 10D also shows that the centralized control plane 1236 has a north bound interface 1084 to an application layer 1086, in which resides application(s) 1088. The centralized control plane 1236 has the ability to form virtual networks 1092 (sometimes referred to as a logical forwarding plane, network services, or overlay networks (with the NEs 1230A-H of the user plane 1080 being the underlay network)) for the application(s) 1088. Thus, the centralized control plane 1236 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1232 separate from the centralized approach 1234, the effort of network control may be distributed differently or the two combined in certain embodiments of the invention. For example: 1) embodiments may generally use the centralized approach (SDN) 1234, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1234 but may also be considered a hybrid approach.

While FIG. 10D illustrates the simple case where each of the NDs 1000A-H implements a single NE 1230A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1238 may also emulate the implementation of multiple VNEs in a single ND. Specifically, instead of (or in addition to) implementing multiple VNEs in a single ND, the network controller 1238 may present the implementation of a VNE/NE in a single ND as multiple VNEs in the virtual networks 1092 (all in the same one of the virtual network(s) 1092, each in different ones of the virtual network(s) 1092, or some combination). For example, the network controller 1238 may cause an ND to implement a single VNE (a NE) in the underlay network, and then logically divide up the resources of that NE within the centralized control plane 1236 to present different VNEs in the virtual network(s) 1092 (where these different VNEs in the overlay networks are sharing the resources of the single VNE/NE implementation on the ND in the underlay network).

On the other hand, FIGS. 10E and 10F respectively illustrate exemplary abstractions of NEs and VNEs that the network controller 1238 may present as part of different ones of the virtual networks 1092. FIG. 10E illustrates the simple case of where each of the NDs 1000A-H implements a single NE 1230A-H (see FIG. 10D), but the centralized control plane 1236 has abstracted multiple of the NEs in different NDs (the NEs 1230A-C and G-H) into (to represent) a single NE 1230I in one of the virtual network(s) 1092 of FIG. 10D, according to some embodiments of the invention. FIG. 10E shows that in this virtual network, the NE 1230I is coupled to NE 1230D and 1230F, which are both still coupled to NE 1230E.

FIG. 10F illustrates a case where multiple VNEs (VNE 1230A.1 and VNE 1230H.1) are implemented on different NDs (ND 1000A and ND 1000H) and are coupled to each other, and where the centralized control plane 1236 has abstracted these multiple VNEs such that they appear as a single VNE 1230T within one of the virtual networks 1092 of FIG. 10D, according to some embodiments of the invention. Thus, the abstraction of a NE or VNE can span multiple NDs.

While some embodiments of the invention implement the centralized control plane 1236 as a single entity (e.g., a single instance of software running on a single electronic device), alternative embodiments may spread the functionality across multiple entities for redundancy and/or scalability purposes (e.g., multiple instances of software running on different electronic devices).

Figure 11:
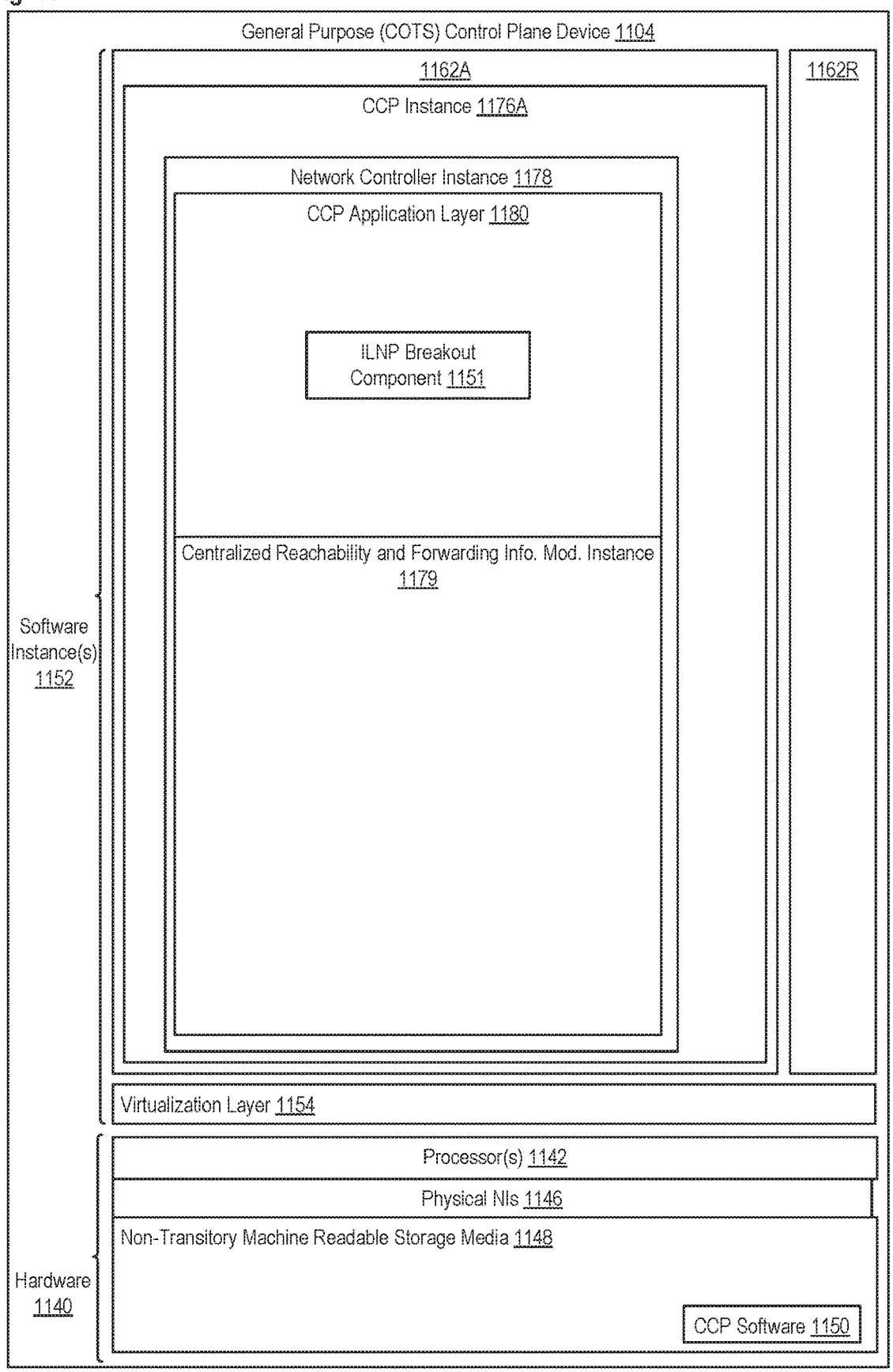
FIG. 11 illustrates a general-purpose control plane device with centralized control plane (CCP) software 1150), according to some embodiments.

Similar to the network device implementations, the electronic device(s) running the centralized control plane 1236, and thus the network controller 1238 including the centralized reachability and forwarding information module 1239, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 11 illustrates, a general-purpose control plane device 1104 including hardware 1140 comprising a set of one or more processor(s) 1142 (which are often COTS processors) and physical NIs 1146, as well as non-transitory machine-readable storage media 1148 having stored therein centralized control plane (CCP) software 1150 and an ILNP breakout component 1151.

In embodiments that use compute virtualization, the processor(s) 1142 typically execute software to instantiate a virtualization layer 1154 (e.g., in one embodiment the virtualization layer 1154 represents the kernel of an operating system (or a shim executing on a base operating system) that allows for the creation of multiple instances 1162A-R called software containers (representing separate user spaces and also called virtualization engines, virtual private servers, or jails) that may each be used to execute a set of one or more applications; in another embodiment the virtualization layer 1154 represents a hypervisor (sometimes referred to as a virtual machine monitor (VMM)) or a hypervisor executing on top of a host operating system, and an application is run on top of a guest operating system within an instance 1162A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1140, directly on a hypervisor represented by virtualization layer 1154 (in which case the unikernel is sometimes described as running within a LibOS virtual machine), or in a software container represented by one of instances 1162A-R). Again, in embodiments where compute virtualization is used, during operation an instance of the CCP software 1150 (illustrated as CCP instance 1176A) is executed (e.g., within the instance 1162A) on the virtualization layer 1154. In embodiments where compute virtualization is not used, the CCP instance 1176A is executed, as a unikernel or on top of a host operating system, on the "bare metal" general purpose control plane device 1104. The instantiation of the CCP instance 1176A, as well as the virtualization layer 1154 and instances 1162A-R if implemented, are collectively referred to as software instance(s) 1152.

In some embodiments, the CCP instance 1176A includes a network controller instance 1178. The network controller instance 1178 includes a centralized reachability and forwarding information module instance 1179 (which is a middleware layer providing the context of the network controller 1238 to the operating system and communicating with the various NEs), and an CCP application layer 1180 (sometimes referred to as an application layer) over the middleware layer (providing the intelligence required for various network operations such as protocols, network situational awareness, and user-interfaces). At a more abstract level, this CCP application layer 1180 within the centralized control plane 1236 works with virtual network view(s) (logical view(s) of the network) and the middleware layer provides the conversion from the virtual networks to the physical view.

The ILNP breakout component 1151 can be executed by hardware 1140 to perform operations of one or more embodiments of the present invention as part of software instances 1152.

The centralized control plane 1236 transmits relevant messages to the user plane 1080 based on CCP application layer 1180 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the user plane 1080 may receive different messages, and thus different forwarding information. The user plane 1080 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the user plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the user plane 1080, the packet (or a subset of the packet header and content) is typically forwarded to the centralized control plane 1236. The centralized control plane 1236 will then program forwarding table entries into the user plane 1080 to accommodate packets belonging to the flow of the unknown packet. Once a specific forwarding table entry has been programmed into the user plane 1080 by the centralized control plane 1236, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device functioning as a source gNodeB in a cellular communication network to support incremental deployment of identifier locator network protocol (ILNP) breakout in the cellular communication network, the method comprising:
sending a list of data network names (DNNs) advertised by an access and mobility management function (AMF) to a user equipment (UE);
receiving from the UE a first request for a first session with an ILNP session and service continuity (SSC) mode;
facilitating the UE establishing a first packet data network (PDN) session associated with a UE selected DNN, where the first PDN session requests the ILNP SSC mode;
receiving from the UE a second request for a second session to the selected DNN using a non-ILNP SSC mode; and
facilitating the UE establishing a second PDN session to the selected DNN using the non-ILNP SSC mode.

2. The method of claim 1, further comprising:
receiving, from the UE via the first PDN session, a first packet destined for a first Correspondent Node (CN);
forwarding the first packet to the first CN via a user plane function (UPF) that implements ILNP SSC mode;
receiving, from the UE via the second PDN session, a second packet destined for a second CN; and
forwarding the second packet to the second CN via the UPF in the core of the cellular communication network.

3. The method of claim 1, further comprising:
determining that the UE is to be handed over to a target gNodeB that has ILNP breakout capability;
sending a handover request message to the target gNodeB;
receiving a handover request acknowledgement from the target gNodeB;
notifying the UE that the target gNodeB is ready; and
tearing down the session with a source user plane function (UPF).

4. The method of claim 1, further comprising:
receiving notification from a service management function (SMF) to redirect traffic for the UE to a target user plane function (UPF);
overwriting a destination locator in a header of a packet destined for the UE with a locator associated with the target UPF; and
removing state associated with re-direction to the target UPF, in response to a timer expiration.

5. The method of claim 1, further comprising
receiving a third packet destined for a second UE that is not connected to the gNodeB;
querying a mapping system for a locator of the second UE;
receiving a reply from the mapping system indicating the locator of the second UE;
overwriting a destination locator in a header of the third packet with the locator indicated by the reply received from the mapping system; and
forwarding the third packet.

6. A method implemented by a user equipment (UE) in a cellular communication network to support incremental deployment of identifier locator network protocol (ILNP) breakout in the cellular communication network, the method comprising:
receiving an advertisement for a list of data network names (DNNs) from a source gNodeB;
establishing a first PDN session associated with a DNN selected from the list using an ILNP session and service continuity (SSC) mode;
establishing a second PDN session associated with the selected DNN using a non-ILNP SSC mode;
sending traffic destined for a first Correspondent Node (CN) that is ILNP capable via the first PDN session; and
sending traffic destined for a second CN that is not ILNP capable via the second PDN session.

7. The method of claim 6, further comprising:
receiving an indication from the source gNodeB that the UE is to be handed over to a target gNodeB;
disconnecting from the source gNodeB;
connecting to the target gNodeB; and
sending a redirect message to the first CN that indicates how the UE can be reached.

8. The method of claim 7, wherein the target gNodeB has ILNP breakout capability, and wherein the redirect message indicates that the UE can be reached using a locator assigned to the UE at the target gNodeB.

9. The method of claim 7, further comprising:
receiving traffic buffered at the target gNodeB that was forwarded by the source gNodeB to the target gNodeB.

10. The method of claim 7, wherein the target gNodeB does not have ILNP breakout capability, and wherein the redirect message indicates that the UE can be reached using a locator associated with a user plane function (UPF) in the core of the cellular communication network.

11. A network device to function as a source gNodeB in a cellular communication network to support incremental deployment of identifier locator network protocol (ILNP) breakout in the cellular communication network, the network device comprising:
a non-transitory computer-readable medium having stored therein an ILNP breakout component; and
a set of one or more processors coupled to the non-transitory computer-readable medium, the set of one or more processors to execute the ILNP breakout component, the ILNP breakout component to send a list of data network names (DNNs) advertised by an access and mobility management function (AMF) to a user equipment (UE), to receive from the UE a first request for a first session with an ILNP session and service continuity (SSC) mode, to facilitate the UE establishing a first packet data network (PDN) session associated with a UE selected DNN, where the first PDN session requests the ILNP SSC mode, to receive from the UE a second request for a second session to the selected DNN using a non-ILNP SSC mode, and to facilitate the UE establishing a second PDN session to the selected DNN using the non-ILNP SSC mode.

12. The network device of claim 11, wherein the ILNP breakout component, when executed by the set of one or more processors, further causes the network device to receive, from the UE via the first PDN session, a first packet destined for a first Correspondent Node (CN), forward the first packet to the first CN via a user plane function (UPF) that implements ILNP SSC mode, receive, from the UE via the second PDN session, a second packet destined for a second CN, and forward the second packet to the second CN via the UPF in the core of the cellular communication network.

13. The network device of claim 11, wherein the ILNP breakout component, when executed by the set of one or more processors, further causes the network device to determine that the UE is to be handed over to a target gNodeB that has ILNP breakout capability, to send a handover request message to the target gNodeB, to receive a handover request acknowledgement from the target gNodeB, to notify the UE that the target gNodeB is ready, and to tear down the session with a source user plane function (UPF).

14. A user equipment (UE) to operate in a cellular communication network that supports incremental deployment of identifier locator network protocol (ILNP) breakout in the cellular communication network, the UE comprising:
a non-transitory computer-readable medium having stored therein an ILNP breakout component; and
a set of one or more processors coupled to the non-transitory computer-readable medium, the set of one or more processors to execute the ILNP breakout component, which causes the UE to receive an advertisement for a list of data network names (DNNs) from a source gNodeB, to establish a first PDN session associated with a DNN selected from the list using an ILNP session and service continuity (SSC) mode, to establish a second PDN session associated with the selected DNN using a non-ILNP SSC mode, to send traffic destined for a first Correspondent Node (CN) that is ILNP capable via the first PDN session, and to send traffic destined for a second CN that is not ILNP capable via the second PDN session.

15. The UE of claim 14, wherein the ILNP breakout component, when executed by the set of one or more processors, further causes the UE to receive an indication from the source gNodeB that the UE is to be handed over to a target gNodeB, disconnect from the source gNodeB, to connect to the target gNodeB, and to send a redirect message to the first CN that indicates how the UE can be reached.

16. The UE of claim 15, wherein the target gNodeB has ILNP breakout capability, and wherein the redirect message indicates that the UE can be reached using a locator assigned to the UE at the target gNodeB.

17. The UE of claim 15, wherein the ILNP breakout component, when executed by the set of one or more processors, further causes the UE to receive traffic buffered at the target gNodeB that was forwarded by the source gNodeB to the target gNodeB.

18. The UE of claim 15, wherein the target gNodeB does not have ILNP breakout capability, and wherein the redirect message indicates that the UE can be reached using a locator associated with a user plane function (UPF) in the core of the cellular communication network.

19. The UE of claim 15, wherein the redirect message is an Internet Control Message Protocol (ICMP) redirect message.

20. The UE of claim 14, wherein the ILNP breakout component, when executed by the set of one or more processors, further causes the UE to send an update message to a mapping server that indicates how the UE can be reached.

* * * * *